US012568254B2

(12) United States Patent   (10) Patent No.:   US 12,568,254 B2
Takeda                           (45) Date of Patent:        Mar. 3, 2026

(54) INFORMATION PROCESSING APPARATUS, CONTROL METHOD FOR INFORMATION PROCESSING APPARATUS, STORAGE MEDIUM, INFORMATION PROCESSING SYSTEM, AND CONTROL METHOD FOR INFORMATION PROCESSING SYSTEM

(71) Applicant: CANON KABUSHIKI KAISHA, Tokyo (JP)

(72) Inventor: Eishi Takeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 18/482,742

(22) Filed: Oct. 6, 2023

(65) Prior Publication Data

US 2024/0121449 A1    Apr. 11, 2024

(30) Foreign Application Priority Data

Oct. 11, 2022    (JP) ................................. 2022-163113

(51) Int. Cl.
| | |
|---|---|
| *H04N 21/2187* | (2011.01) |
| *G06Q 20/10* | (2012.01) |
| *G06V 10/56* | (2022.01) |
| *H04N 21/233* | (2011.01) |
| *H04N 21/431* | (2011.01) |
| *H04N 21/4788* | (2011.01) |

(52) U.S. Cl.
CPC ......... *H04N 21/2187* (2013.01); *G06Q 20/10* (2013.01); *G06V 10/56* (2022.01); *H04N 21/233* (2013.01); *H04N 21/4318* (2013.01); *H04N 21/4788* (2013.01)

(58) Field of Classification Search
CPC ............. H04N 21/2187; H04N 21/233; H04N 21/4318; H04N 21/4788; G06Q 20/10; G06Q 20/123; G06Q 30/06; G06Q 50/01; G06V 10/56
See application file for complete search history.

(56) References Cited

U.S. PATENT DOCUMENTS

| | | | |
|---|---|---|---|
| 2014/0136352 A1* | 5/2014 | Ramakrishna ....... | G06Q 20/384 705/44 |
| 2016/0239838 A1* | 8/2016 | Yang ...................... | G06Q 20/40 |
| 2024/0388767 A1* | 11/2024 | Horiuchi ................ | H04L 67/02 |

FOREIGN PATENT DOCUMENTS

JP          2021120795 A      8/2021

* cited by examiner

*Primary Examiner* — Alazar Tilahun
(74) *Attorney, Agent, or Firm* — Canon U.S.A., Inc. IP Division

(57)                ABSTRACT

An information processing apparatus for displaying content received from a server apparatus includes a transmission unit that transmits, to the server apparatus, information indicating a first monetary value of a thing and a second monetary value of a thing to be provided to a streamer of the content, in response to an operation performed on the information processing apparatus by a first user of the information processing apparatus and a second user of another information processing apparatus, a reception unit that receives, from the server apparatus, respective pieces of information indicating the first monetary value of the thing and the second monetary value of the thing have provided to the streamer, and a control unit that performs control in such a way as to output the information indicating the first monetary value of the thing and the information indicating the second monetary value of the thing in different forms.

18 Claims, 28 Drawing Sheets

FIG.4

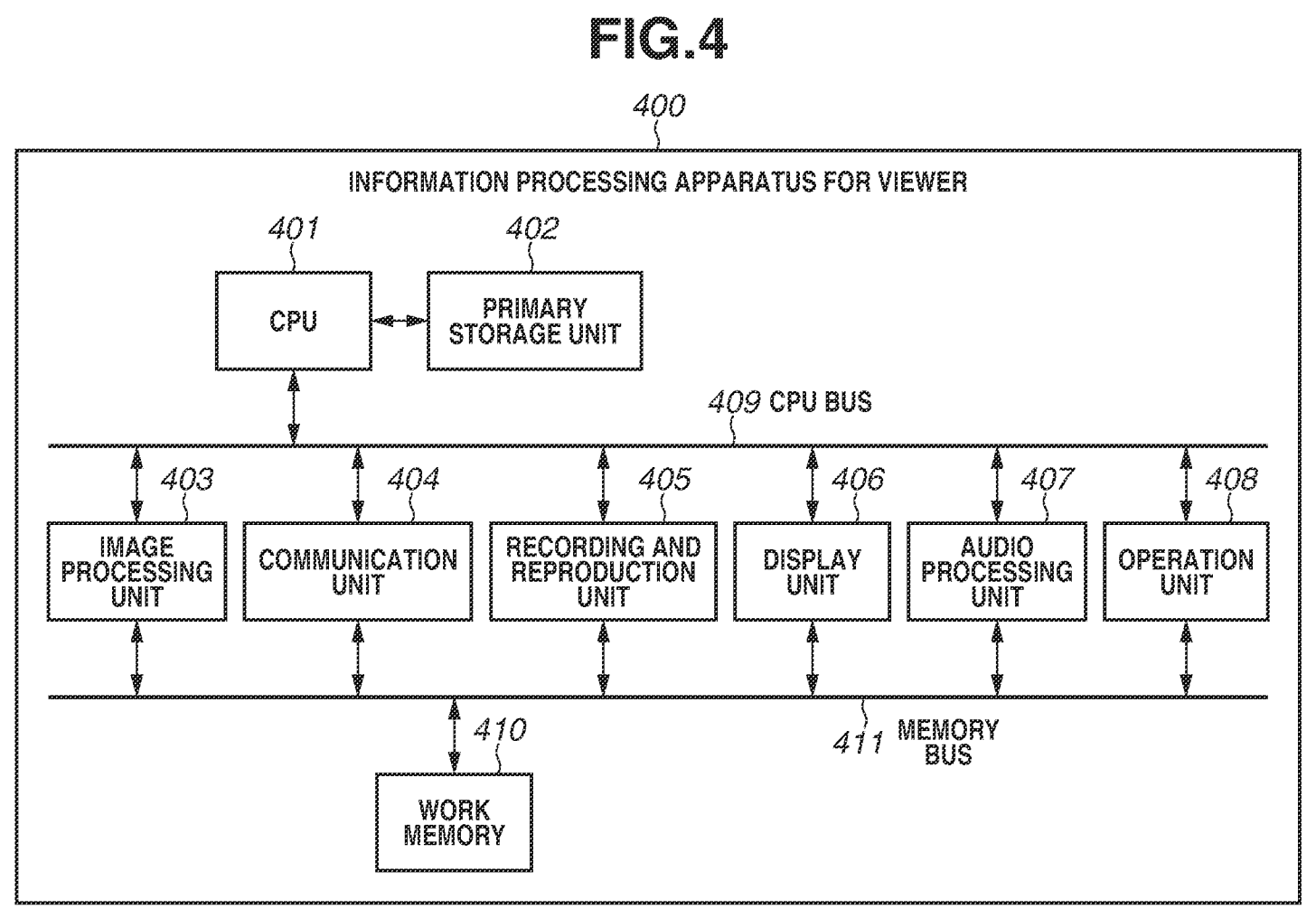

400 INFORMATION PROCESSING APPARATUS FOR VIEWER

401 CPU

402 PRIMARY STORAGE UNIT

403 IMAGE PROCESSING UNIT

404 COMMUNICATION UNIT

405 RECORDING AND REPRODUCTION UNIT

406 DISPLAY UNIT

407 AUDIO PROCESSING UNIT

408 OPERATION UNIT

409 CPU BUS

410 WORK MEMORY

411 MEMORY BUS

DISPLAY EXAMPLE OF DIFFERENTIATING AMOUNTS OF SOCIAL TIPPING PERFORMED BY OTHER USERS WITH STICKER COLORATION

DISPLAY EXAMPLE OF DIFFERENTIATING AMOUNTS OF SOCIAL TIPPING PERFORMED BY OTHER USERS WITH ICON TYPE

DISPLAY EXAMPLE OF DIFFERENTIATING AMOUNTS OF SOCIAL TIPPING
PERFORMED BY OTHER USERS WITH ICON SIZE OR NUMBER OF ICONS

DISPLAY EXAMPLE IN INFORMATION PROCESSING APPARATUS FOR STREAMER

DISPLAY EXAMPLE OF HIDING COMMENT IN SOCIAL TIPPING PERFORMED BY OTHER USER

DISPLAY EXAMPLE OF DISPLAYING ONLY COMMENT IN SOCIAL
TIPPING PERFORMED BY OTHER USER THE AMOUNT OF
WHICH IS PREDETERMINED AMOUNT OR MORE
(PREDETERMINED AMOUNT OR LESS)

DISPLAY EXAMPLE OF DISPLAYING ONLY
COMMENTS IN SOCIAL TIPPING PERFORMED BY
UP TO PREDETERMINED NUMBER OF OTHER USERS

FIG.14

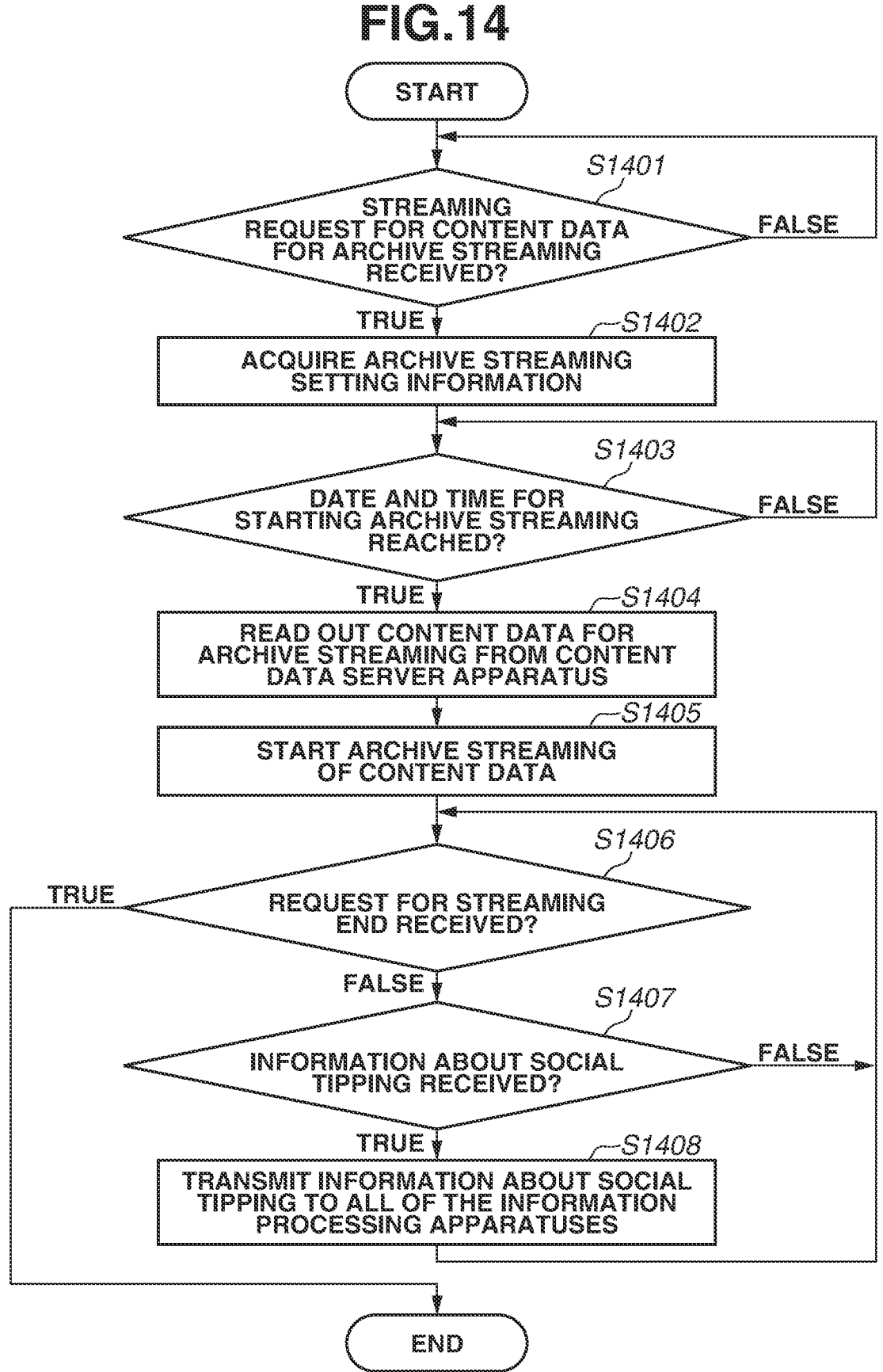

START

S1401

STREAMING REQUEST FOR CONTENT DATA FOR ARCHIVE STREAMING RECEIVED?  FALSE

TRUE  S1402

ACQUIRE ARCHIVE STREAMING SETTING INFORMATION

S1403

DATE AND TIME FOR STARTING ARCHIVE STREAMING REACHED?  FALSE

TRUE  S1404

READ OUT CONTENT DATA FOR ARCHIVE STREAMING FROM CONTENT DATA SERVER APPARATUS

S1405

START ARCHIVE STREAMING OF CONTENT DATA

S1406

TRUE  REQUEST FOR STREAMING END RECEIVED?

FALSE  S1407

INFORMATION ABOUT SOCIAL TIPPING RECEIVED?  FALSE

TRUE  S1408

TRANSMIT INFORMATION ABOUT SOCIAL TIPPING TO ALL OF THE INFORMATION PROCESSING APPARATUSES

END

DISPLAY EXAMPLE OF INITIAL BACKGROUND SCREEN
AT THE TIME OF STREAMING OF AUDIO-ONLY CONTENT

DISPLAY EXAMPLE WHEN AUDIO-ONLY
CONTENT IS BEING STREAMED

DISPLAY EXAMPLE BEFORE INTEGRATION OF PIECES OF INFORMATION ABOUT SOCIAL TIPPING CONSECUTIVELY PERFORMED

DISPLAY EXAMPLE AFTER INTEGRATION OF PIECES OF INFORMATION ABOUT SOCIAL TIPPING CONSECUTIVELY PERFORMED

DISPLAY EXAMPLE WHEN NUMBER OF TIMES OF SOCIAL TIPPING WITHIN STREAMING TIME HAS EXCEEDED UPPER LIMIT VALUE

DISPLAY EXAMPLE WHEN NUMBER OF TIMES OF SOCIAL TIPPING WITHIN PREDETERMINED TIME HAS EXCEEDED UPPER LIMIT VALUE

DISPLAY EXAMPLE OF PRIOR NOTIFICATION OF SOCIAL TIPPING END TIME

DISPLAY EXAMPLE WHEN LAST-MINUTE SOCIAL TIPPING HAS BEEN CANCELLED

INFORMATION PROCESSING APPARATUS, CONTROL METHOD FOR INFORMATION PROCESSING APPARATUS, STORAGE MEDIUM, INFORMATION PROCESSING SYSTEM, AND CONTROL METHOD FOR INFORMATION PROCESSING SYSTEM

BACKGROUND

Field

Aspects of the present disclosure generally relate to an information processing apparatus, a control method for an information processing apparatus, a storage medium, an information processing system, and a control method for an information processing system.

Description of the Related Art

Recently, there has been widespread a system having a social tipping function which allows a viewer to perform social tipping (gratuity) at the time of live streaming in a video sharing site on the Internet.

Moreover, a system having such a social tipping function displays, in real time, the amount of a tip to not only a viewer who has performed social tipping but also all of the viewers including a streamer (distributor). This enables the streamer to immediately return thanks or comments with respect to social tipping, so that there is an advantage that a sense of togetherness between both the streamer and the viewer or a live feeling can be more obtained. On the other hand, there is a disadvantage that, due to the amount of social tipping being viewable by all of the viewers including the streamer, for example, an excessive competition, such as the amount of social tipping becoming higher, between viewers may occur.

Japanese Patent Application Laid-Open No. 2021-120795 discusses a technique in which a server compares a cumulative total of social tipping and an upper limit value with each other for each viewer, determines whether to allow reception of a social tipping request from a viewer, and inhibits a social tipping action which exceeds the viewer's ability to pay.

However, the technique discussed in Japanese Patent Application Laid-Open No. 2021-120795 is capable of preventing an expensive social tip which exceeds the ability to pay of each viewer, but is not able to solve an issue in which an excessive competition occurs between viewers.

SUMMARY

According to an aspect of the present disclosure, an information processing apparatus for displaying content received from a server apparatus on a display unit includes a transmission unit configured to transmit, to the server apparatus, information indicating a first monetary value of a thing which is to be provided to a streamer of the content, in response to an operation performed on the information processing apparatus by a first user of the information processing apparatus, and to transmit, to the server apparatus, information indicating a second monetary value of a thing which is to be provided to the streamer of the content, in response to an operation performed on the information processing apparatus by a second user of another information processing apparatus, a reception unit configured to receive, from the server apparatus, respective pieces of information indicating the first monetary value of the thing which the first user and the second user have provided to the streamer, and a control unit configured to perform control in such a way as to output the information indicating the first monetary value of the thing and the information indicating the second monetary value of the thing in different forms.

Further features of the present disclosure will become apparent from the following description of exemplary embodiments with reference to the attached drawings.

BRIEF DESCRIPTION OF THE DRAWINGS

FIG. 4 is a diagram illustrating an example of a hardware configuration of an information processing apparatus for viewer in the first exemplary embodiment.

FIG. 14 is a flowchart illustrating an operation of the server apparatus in the second exemplary embodiment.

DESCRIPTION OF THE EMBODIMENTS

Various exemplary embodiments, features, and aspects of the disclosure will be described in detail below with reference to the drawings.

Each exemplary embodiment is based on a system which allows a viewer for content to provide a thing having a monetary value to a streamer of the content so as to support or help the streamer. Here, the thing can be what is called a social tip (gratuity), can be a currency for use in a system (intra-system currency), or can be a gift for use in a system. Moreover, information indicating a monetary value of a thing is, for example, information about the amount of money in the case of social tipping or intra-system currency, and is information indicating the value of a gift in the case of gift.

The following exemplary embodiments are described with respect to a case where a thing which is provided to a streamer is a social tip.

<System Configuration>

Figure 1:
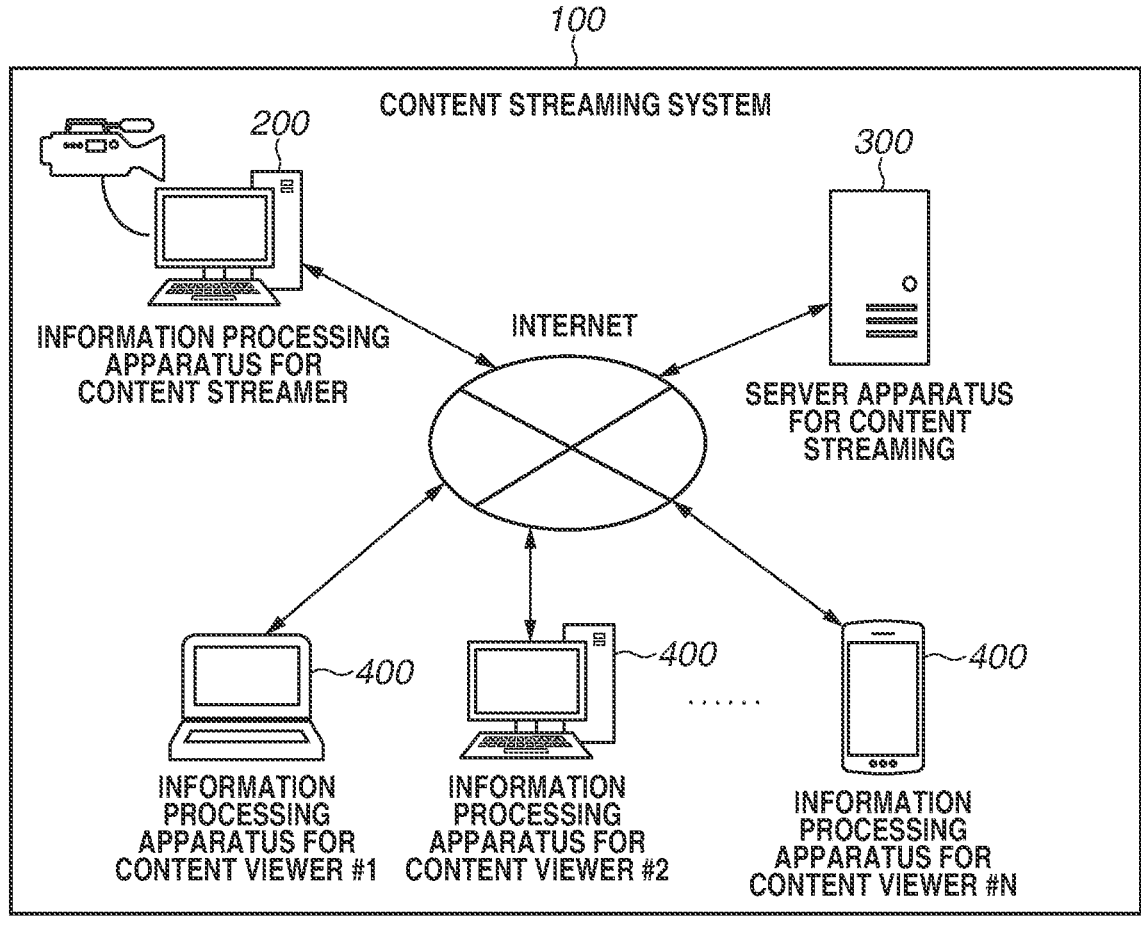
FIG. 1 is a diagram illustrating a configuration of an information processing system in a first exemplary embodiment.

FIG. 1 is a diagram illustrating a configuration of a content streaming system 100 serving as an information processing apparatus in a first exemplary embodiment.

The content streaming system 100 includes an information processing apparatus for streamer (information processing apparatus for content streamer) 200, a server apparatus (server apparatus for content streaming) 300, and information processing apparatuses for viewer (information processing apparatuses for content viewer) 400. The respective apparatuses are connected to each other mainly via the Internet. The respective apparatuses are based on the premise that the apparatuses transmit and receive controls signals and data between the apparatuses, but, depending on the requirement of security, confidentiality, or allowable transmission delay of data to be handled, the apparatuses can be configured to be connected to each other via dedicated lines or physical cables.

<Information Processing Apparatus for Streamer>

The information processing apparatus for streamer 200 has an image capturing function and a sound collection function which allow a streamer who operates the information processing apparatus for streamer 200 to generate content, such as video, chat, singing, or musical performance. Moreover, the information processing apparatus for streamer 200 has a communication function which is capable of, by connecting to the Internet, transmitting and receiving content data to and from the server apparatus 300 and receiving information about social tipping from viewers. Furthermore, the information processing apparatus for streamer 200 is connected to the Internet with use of a public wireless communication network, a wireless communication method such as Wi-Fi, or a wired communication method such as a local area network (LAN) cable.

Moreover, the information processing apparatus for streamer 200 has a function which allows a streamer to cause content data which is being streamed and information about social tipping to be displayed on, for example, a monitor or a panel in a visually recognizable manner.

The information processing apparatus for streamer 200 is assumed to be a personal computer, a notebook computer, a smartphone, or a tablet terminal, each of which includes a camera and a microphone, but only needs to be an apparatus having a similar function and is not particularly limited.

<Server Apparatus>

The server apparatus 300, as with the information processing apparatus for streamer 200, has a communication function which, by connecting to the Internet, transmits and receives various pieces of data and commands to and from the respective apparatuses and a server function which performs, in a concentrated way, content streaming, which is performed as a website program, and management of social tipping.

A major role of the server function in the server apparatus 300 is to receive content data from the information processing apparatus for streamer 200 and manages content data for each channel established for each streamer on, for example, a video sharing website which is executed in the server apparatus 300. Then, based on access requests from the information processing apparatuses for viewer 400 made by operations performed by many and unspecified viewers, the server apparatus 300 streams content data in conformity with viewing environments of the respective viewers. Moreover, the server apparatus 300 performs a series of action processing operations for social tipping in a concentrated way, including receiving information about social tipping directed to a streamer from a viewer, performing processing concerning social tipping, and then transmitting information about social tipping to the streamer and the viewer.

<Information Processing Apparatus for Viewer>

The information processing apparatus for viewer 400 has a communication function of connecting to the Internet, as with the information processing apparatus for streamer 200 and the server apparatus 300. Moreover, the information processing apparatus for viewer 400 has the function of executing a web browser or a dedicated application program, which runs on the information processing apparatus for viewer 400, and displaying content data received from the server apparatus 300, thus enabling the viewer to view the displayed content data. Moreover, the information processing apparatus for viewer 400 has a remittance function of performing social tipping to a streamer for content which the viewer is viewing.

The information processing apparatus for viewer 400 is assumed to be a personal computer, a smartphone, or a tablet terminal, as with the information processing apparatus for streamer 200, but only needs to be an apparatus having a similar function and is not particularly limited.

Furthermore, the reason why, in the system configuration diagram illustrated in FIG. 1, a plurality of information processing apparatuses for viewer 400 is arranged is that a situation in which a plurality of viewers connects to the Internet with respective different apparatus forms and views streamed content is supposed. The plurality of information processing apparatuses for viewer 400 only needs to have a function capable of performing operations illustrated in the flowchart of FIG. 7 described below, and all of the plurality of information processing apparatuses for viewer 400 can be the same type of apparatus or all of the plurality of information processing apparatuses for viewer 400 can be respective different types of apparatuses.

<Configuration of Information Processing Apparatus for Streamer>

Figure 2:
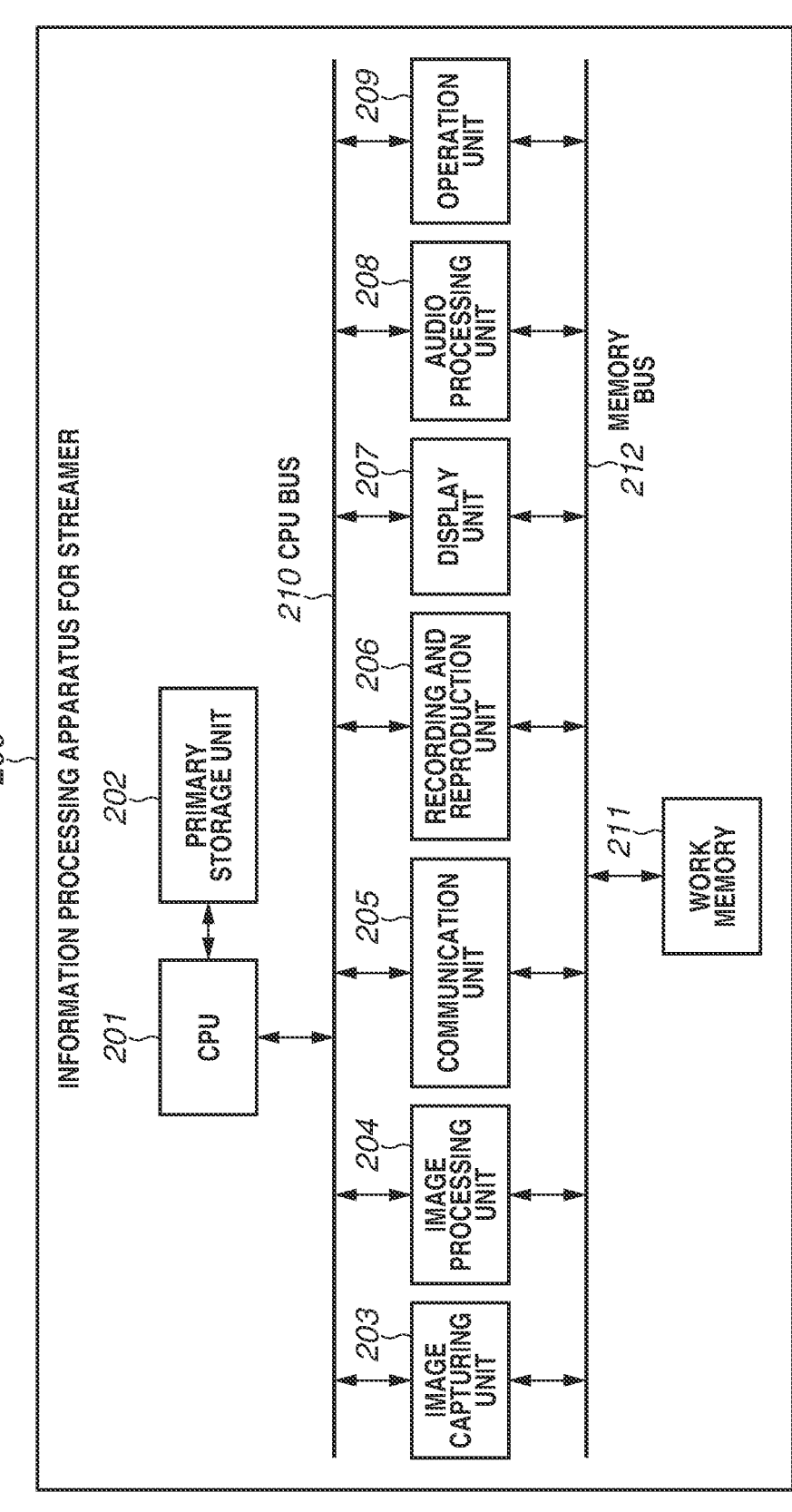
FIG. 2 is a diagram illustrating an example of a hardware configuration of an information processing apparatus for streamer in the first exemplary embodiment.

FIG. 2 is a diagram illustrating an example of a hardware configuration of the information processing apparatus for streamer 200.

The information processing apparatus for streamer 200 includes, for example, a central processing unit (CPU) 201, a primary storage unit 202, an image capturing unit 203, an image processing unit 204, a communication unit 205, a recording and reproduction unit 206, a display unit 207, an audio processing unit 208, an operation unit 209, a CPU bus 210, a work memory 211, and a memory bus 212.

The CPU 201 performs, for example, start-up, stoppage, and interrupt notification of the image capturing unit 203, the image processing unit 204, the communication unit 205, the recording and reproduction unit 206, the display unit 207, the audio processing unit 208, and the operation unit 209 via the CPU bus 210, thus controlling various operations of the information processing apparatus for streamer 200. The CPU 201 implements various functions which the information processing apparatus for streamer 200 provides, by loading and executing a program stored in, for example, the primary storage unit 202.

The primary storage unit 202 is a storage region which is used as, for example, a work area for the CPU 201. The primary storage unit 202 to be used is, for example, a dynamic random access memory (DRAM), a static random access memory (SRAM), or a non-volatile flash memory.

The image capturing unit 203 includes, for example, a camera unit and an optical unit, such as a lens and a charge-coupled device (CCD) sensor. The image capturing unit 203 converts an optical signal taken in via the lens into an electrical signal by the sensor, and then outputs the electrical signal as digital RAW image data converted into the Bayer form to the work memory 211, such as a large-capacity DRAM, via the memory bus 212.

The image processing unit 204 performs what is called development processing, including applying DeBayer processing (demosaic processing) to RAW image data which the image capturing unit 203 has output, converting the processed image data into luminance and chrominance signals, and then removing noise included in each signal, correcting optical distortion, and optimizing an image. Moreover, the image processing unit 204 has the function of detecting a motion or area of a subject included in a captured image and replacing the subject with a preliminarily prepared computer graphic character image, i.e., what is called an avatar image.

The image processing unit 204 performs, on image data subjected to image processing, image compression coding that is based on a standardization standard, such as Joint Photographic Experts Group (JPEG), Advanced Video Coding (AVC or H.264), or High Efficiency Video Coding (HEVC), and outputs the compressed image data to the work memory 211. Moreover, the image processing unit 204 reads out compressed data from the recording and reproduction unit 206, loads the read-out data onto the work memory 211, and then performs decompression processing to restore image data. Moreover, the image processing unit 204 once loads, onto the work memory 211, compressed data transmitted from an externa server apparatus via the communication unit 205, and then performs decoding and decompression to restore image data.

The above-mentioned image processing function of the image processing unit 204 is supposed to be implemented by dedicated hardware, such as a digital signal processor (DSP), or wired logic (random logic) and to perform high-speed real-time processing. However, the processing to be performed by the image processing unit 204 can be a method capable of implementing equivalent functions and performances by software processing to be performed by the CPU 201, and is not particularly limited.

The communication unit 205 has the function of connecting the information processing apparatus for streamer 200 to an external apparatus. The communication unit 205 connects the information processing apparatus for streamer 200 to an external apparatus via the Internet and performs transmission and reception of various pieces of information and various pieces of data. The communication unit 205 includes a wireless communication interface and a wired communication interface. The wired communication interface is an interface compliant with, for example, a local area network (LAN) or wide area network (WAN) standard using an optical fiber cable or a coaxial cable. The wireless communication interface is an interface compliant with, for example, a public wireless communication standard, such as long-term evolution (LTE) or 5th Generation Mobile Communication System (5G), or any type of communication standard for wireless LAN, such as Wi-Fi.

Furthermore, the communication unit 205 can be any one of a wireless network and a wired network. Additionally, the communication unit 205 can be configured to include the above-mentioned plurality of types of different networks, and is not particularly limited.

The recording and reproduction unit 206 performs writing and reading-out of various pieces of information or data or programs. The recording and reproduction unit 206 to be usable is, for example, a Universal Serial Bus (USB) memory, a Secure Digital (SD) card, a hard disk drive, or a non-volatile memory typified by a flash memory. Moreover, the recording and reproduction unit 206 can be a device which performs writing and reading-out of information, data, and programs with respect to an external storage device using, for example, an optical disc, such as a digital versatile disc-rewritable (DVD-RW), a compact disc-read-only memory (CD-ROM), a CD recordable (CD-R), or a DVD-random access memory (DVD-RAM).

Furthermore, the recording and reproduction unit 206 is supposed to be used as a secondary storage unit in or from which image data temporarily stored mainly in the work memory 211 is stored or reproduced, but can be used to record a program or data which the CPU 201 executes and is not particularly limited.

The display unit 207 is an output interface which displays graphics data, such as characters or menu icons which the CPU 201 has generated, or image data developed by the image processing unit 204 or decoded image data. The display unit 207 to be used is a display monitor device such as an organic electroluminescent display (EL) or a liquid crystal display (LCD).

The audio processing unit 208 has the function of performing digital-to-analog conversion or analog-to-digital conversion on, for example, the voice of the streamer with use of an audio input and output device or preliminarily programmed sound effects which are executed by, for example, the CPU 201 and inputting or outputting the converted sound. Here, the audio input and output device is, for example, a microphone, a loudspeaker, or an audio terminal incorporated in the information processing apparatus for streamer 200 or headphones, earphones, a microphone, or a loudspeaker connected by, for example, a wireless interface such as Bluetooth.

The operation unit 209 is configured with one or more operation members (operation units) which are used for the streamer to input various keys and operation instructions. The operation unit 209 implements, for example, an operation mode instruction or selection determination for the information processing apparatus for streamer 200 and text input by, for example, buttons, switches, a keyboard, or a pointing device such as a mouse. Furthermore, the operation unit 209 can be configured to implement an input interface function by detecting a contact position with, for example, a touch panel integrated with the display unit 207.

The CPU bus 210 is a bus for control which connects CPU 201 to the above-mentioned processing blocks. The CPU bus 210 can be compatible with a standardization bus standard method similar to that for the memory bus 212, can be compatible with a low-speed serial method such as Inter-Integrated Circuit ($I^2C$) if there is a sufficient processing margin, and is not particularly limited in the compatible method.

The work memory 211 is used for storage as a temporarily work area, and, as with the primary storage unit 202, for example, a DRAM or an SRAM is used therefor. The work memory 211 stores, for example, RAW image data which the image capturing unit 203 outputs, image data which is input to or output from the image processing unit 204, and data which the communication unit 205 has received from an external apparatus. Moreover, the work memory 211 stores, for example, a menu or character data which is to be output in superimposition on image data from the display unit 207 or audio data which is processed by the audio processing unit 208.

The memory bus 212 is a data bus which connects each of the image capturing unit 203, the image processing unit 204, the communication unit 205, the recording and reproduction unit 206, the display unit 207, the audio processing unit 208, and the operation unit 209 to the work memory 211 and is used to transfer image data and various pieces of parameter data at high speed. The transfer method of the memory bus 212 can be a regular bus standard, such as Industry Standard Architecture (ISA), Peripheral Component Interconnect Express (PCI Express), or Advanced eXtensible Interface (AXI), can be a unique bus method, and is not particularly limited.

<Configuration of Server Apparatus>

Figure 3:
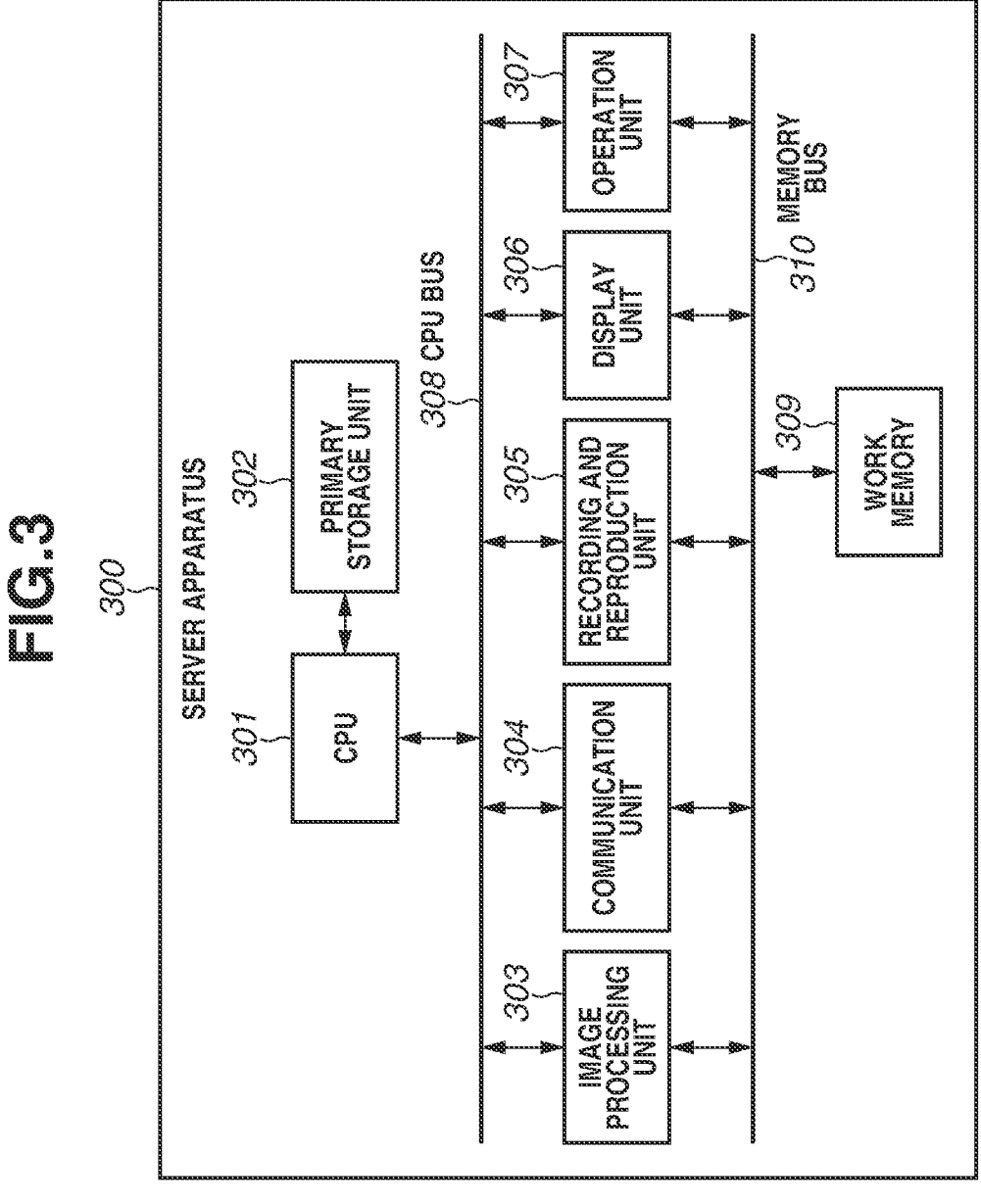
FIG. 3 is a diagram illustrating an example of a hardware configuration of a server apparatus in the first exemplary embodiment.

FIG. 3 is a diagram illustrating an example of a hardware configuration of the server apparatus 300.

The server apparatus 300 includes, for example, a CPU 301, a primary storage unit 302, an image processing unit 303, a communication unit 304, a recording and reproduction unit 305, a display unit 306, an operation unit 307, a CPU bus 308, a work memory 309, and a memory bus 310.

The CPU 301 performs, for example, start-up, stoppage, and interrupt notification of the image processing unit 303, the communication unit 304, the recording and reproduction unit 305, the display unit 306, and the operation unit 307 via the CPU bus 308, thus controlling various operations of the server apparatus 300. The CPU 301 implements various functions which the server apparatus 300 provides, by loading and executing a program stored in, for example, the primary storage unit 302, the work memory 309, or the recording and reproduction unit 305.

The primary storage unit 302 is a storage region which is used as, for example, a work area for the CPU 301. The primary storage unit 302 to be used is, for example, a DRAM or an SRAM.

The image processing unit 303 performs decoding processing of content data generated by the information processing apparatus for streamer 200 received via the communication unit 304 and performs compression processing in such a way as to obtain an image size and frame rate most suitable for streaming to the information processing apparatus for viewer 400. Moreover, the image processing unit 303 generates graphics data or information about social tipping which is to be individually displayed by the information processing apparatus for streamer 200 or the information processing apparatus for viewer 400.

The communication unit 304 is an interface which connects the server apparatus 300 to an external apparatus. The server apparatus 300 uses the communication unit 304 to perform transmission and reception of various pieces of information or various pieces of data between the server apparatus 300 and an external apparatus. Furthermore, a specific network configuration is similar to that of the information processing apparatus for streamer 200 and is, therefore, omitted from description.

The recording and reproduction unit 305 performs writing and reading-out of various pieces of information or data or programs. The recording and reproduction unit 305 to be used includes, for example, a hard disk drive or a non-volatile memory such as a solid state drive (SSD). Moreover, the recording and reproduction unit 305 can be a device which performs writing and reading-out of information, data, and programs with respect to an external storage device using, for example, an optical disc, such as a DVD-RW, a CD-ROM, a CD-R, or a DVD-RAM.

The display unit 306 is an output interface which displays various pieces of information to a user with administrator rights who operates the server apparatus 300, and displays display information indicating, for example, an image. A display monitor device, such as an organic EL display or an LCD, can be used as the display unit 306.

Furthermore, if the server apparatus 300 includes a unit which enables visually recognizing information about the server apparatus 300 by remote desktop connection via, for example, the communication unit 304, the server apparatus 300 does not need to include the display unit 306. In a case where the server apparatus 300 does not include the display unit 306, the server apparatus 300 does not need to have a display control function which controls operations of the display unit 306.

The operation unit 307 is an input interface which receives an instruction from a user with administrator rights for the server apparatus 300. The operation unit 307 to be used is, for example, a keyboard, a pointing device, or a touch panel.

Furthermore, if the server apparatus 300 includes, for example, an input interface unit which enables the user to control the server apparatus 300 by remote desktop connection via the communication unit 304, the server apparatus 300 does not need to include the operation unit 307. In a case where the server apparatus 300 does not include the operation unit 307, the server apparatus 300 does not need to have an operation unit control function which controls operations of the operation unit 307.

The CPU bus 308 is assumed to have the same configuration as that of the CPU bus 210 of the information processing apparatus for streamer 200 and have a function similar to that thereof.

The work memory 309 is used for storage as a temporarily work area, and, as with the primary storage unit 302, for example, a DRAM or an SRAM is used therefor. The work memory 309 stores, for example, image data which is input to or output from the image processing unit 303, data which the communication unit 304 has received from an external apparatus, and data which is to be output by the display unit 306.

The memory bus 310 is assumed to have the same configuration as that of the memory bus 212 of the information processing apparatus for streamer 200 and have a function similar to that thereof.

<Configuration of Information Processing Apparatus for Viewer>

FIG. 4 is a diagram illustrating an example of a hardware configuration of the information processing apparatus for viewer 400.

The information processing apparatus for viewer 400 includes, for example, a CPU 401, a primary storage unit 402, an image processing unit 403, a communication unit 404, a recording and reproduction unit 405, a display unit 406, an audio processing unit 407, an operation unit 408, a CPU bus 409, a work memory 410, and a memory bus 411.

Furthermore, in the hardware configuration of the information processing apparatus for viewer 400, functions similar to those of the information processing apparatus for streamer 200 are omitted from description as appropriate.

The CPU 401 performs, for example, start-up, stoppage, and interrupt notification of the image processing unit 403, the communication unit 404, the recording and reproduction unit 405, the display unit 406, the audio processing unit 407, and the operation unit 408 via the CPU bus 409, thus controlling various operations of the information processing apparatus for viewer 400. The CPU 401 implements various functions which the information processing apparatus for viewer 400 provides, by loading and executing a program stored in, for example, the primary storage unit 402, the work memory 410, or the recording and reproduction unit 405.

The primary storage unit 402 is a storage region which is used as, for example, a work area for the CPU 401. A specific configuration of the primary storage unit 402 is similar to that of the primary storage unit 202 of the information processing apparatus for streamer 200.

The image processing unit 403 has the function of performing decoding processing of content data received from the server apparatus 300 via the communication unit 404 and performing generation of graphics data based on control information. A specific configuration of the image processing unit 403 is similar to that of the image processing unit 204 of the information processing apparatus for streamer 200.

The communication unit 404 has the function of connecting the information processing apparatus for viewer 400 to an external apparatus. The communication unit 404 connects the information processing apparatus for viewer 400 to an external apparatus via the Internet and performs transmission and reception of various pieces of information and various pieces of data. The communication unit 404 includes a wireless communication interface and a wired communication interface. A specific configuration of the communication unit 404 is similar to that of the communication unit 205 of the information processing apparatus for streamer 200.

The recording and reproduction unit 405 performs writing and reading-out of various pieces of information or data or programs at required timing. The recording and reproduction unit 405 can be configured to store program code which the CPU 401 executes, and is able to be also used for reading-out or writing applications for a program the frequency of access to which is not so high compared with the primary storage unit 402 or the work memory 410. A specific configuration of the recording and reproduction unit 405 is similar to that of the recording and reproduction unit 206 of the information processing apparatus for streamer 200.

The display unit 406 is an output interface which displays content streamed from the server apparatus 300 concurrently with other graphics. A specific configuration of the display unit 406 is similar to that of the display unit 207 of the information processing apparatus for streamer 200.

The audio processing unit 407 has the function of performing digital-to-analog conversion of, for example, audio content streamed from the server apparatus 300 or preliminarily programmed sound effects which, for example, the CPU 401 executes and outputting converted audio content or sound effects to, for example, a loudspeaker, headphones, or earphones.

The operation unit 408 is configured with one or more operation members (operation units) which are used for the viewer to input various keys and operation instructions. A specific configuration of the operation unit 408 is similar to that of the operation unit 209 of the information processing apparatus for streamer 200.

The CPU bus 409 is assumed to have the same configuration as that of the CPU bus 210 of the information processing apparatus for streamer 200 and have a function similar to that thereof.

The work memory 410 is used for storage as a temporarily work area, and, as with the primary storage unit 402, for example, a DRAM or an SRAM is used therefor. The work memory 410 stores, for example, image data which is input to or output from the image processing unit 403, data which the communication unit 404 has received from an external apparatus, and pieces of data which are to be output by the display unit 406 and the audio processing unit 407.

The memory bus 411 is assumed to have the same configuration as that of the memory bus 212 of the information processing apparatus for streamer 200 and have a function similar to that thereof.

<Operation of Information Processing Apparatus for Streamer>

Figure 5:
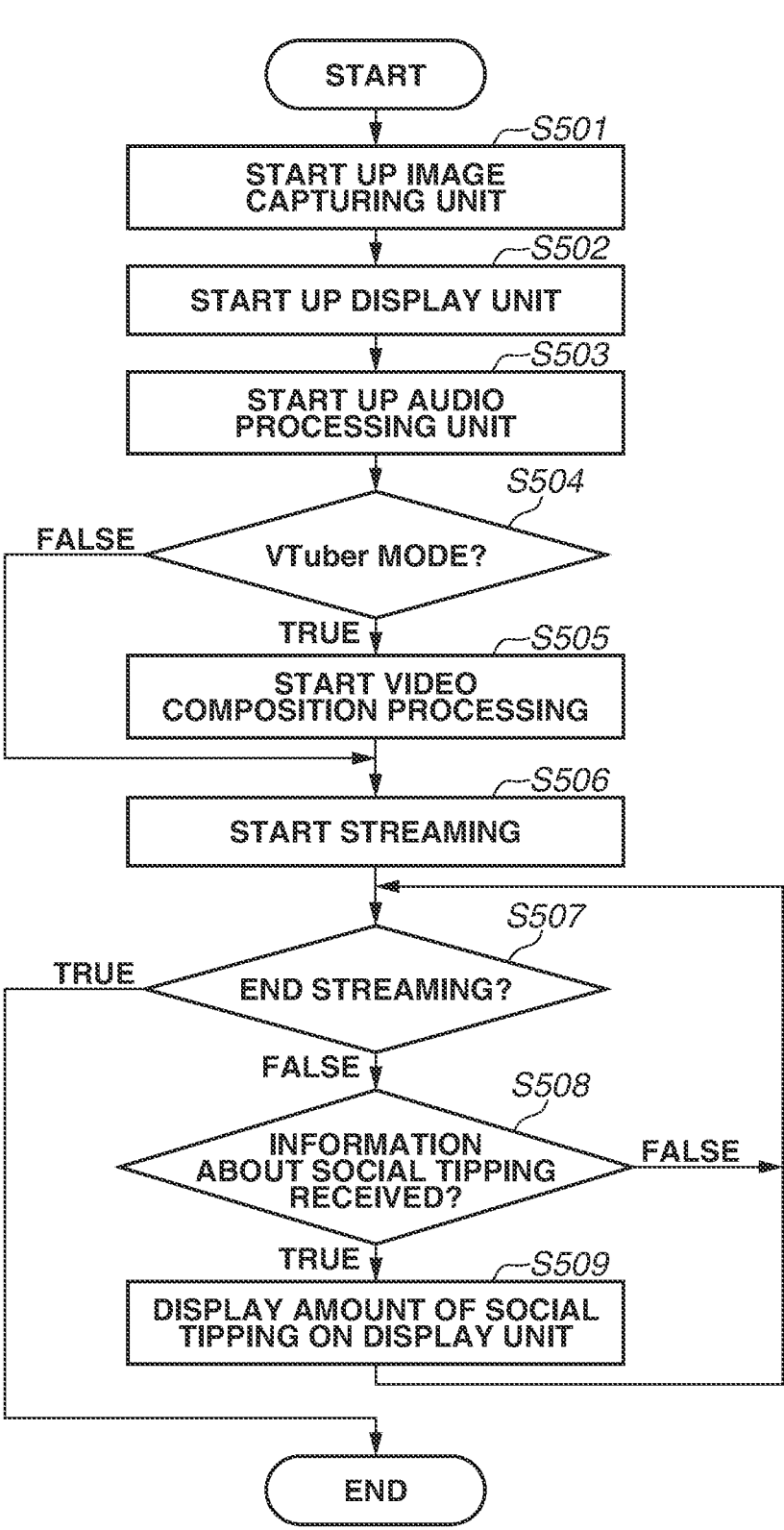
FIG. 5 is a flowchart illustrating an operation of the information processing apparatus for streamer in the first exemplary embodiment.

FIG. 5 is a flowchart illustrating an operation of the information processing apparatus for streamer 200 in the first exemplary embodiment.

The flowchart of FIG. 5 is implemented by the CPU 201 of the information processing apparatus for streamer 200 executing a program to control respective constituent components of the information processing apparatus for streamer 200.

In step S501, the CPU 201 starts up the image capturing unit 203 in response to an operation performed via the operation unit 209 by the streamer. Here, the streamer makes preparations for video streaming that is based on, for example, camera input.

In step S502, the CPU 201 starts up the display unit 207 in response to an operation performed via the operation unit 209 by the streamer. Here, the streamer makes preparations for confirming a video with use of, for example, a monitor device.

In step S503, the CPU 201 starts up the audio processing unit 208 in response to an operation performed via the operation unit 209 by the streamer. Here, the streamer makes preparations for streaming of an audio input that is based on, for example, a microphone.

In step S504, the CPU 201 causes the streamer to select any one of a mode for directly streaming a live-action video captured by the image capturing unit 203 and a VTuber (virtual YouTuber) mode, in which what is called an avatar image is used for a main subject during streaming. If the VTuber mode has been selected (TRUE in step S504), the CPU 201 advances the processing to step S505, and, if the VTuber mode has not been selected (FALSE in step S504), the CPU 201 advances the processing to step S506.

In step S505, with respect to a live-action video acquired by the image capturing unit 203, the CPU 201 causes the image processing unit 204 to perform video composition processing for replacing the live-action video of a main subject with an avatar image generated by computer graphics on a frame-by-frame basis in real time.

When, in the above-described steps S501 to S505, the streamer has confirmed that inputting of a video and audio for streaming operates as intended, the CPU 201 advances the processing to step S506.

In step S506, the CPU 201 starts live streaming by a request for streaming start being transmitted to the server apparatus 300 in response to an operation performed by the streamer via the operation unit 209. Specifically, the streamer logs in to a web content sharing site which the server apparatus 300 provides, with an account which the streamer preliminarily possesses, and establishes and executes a channel for live streaming.

With the start of live streaming, in the information processing apparatus for streamer 200, the captured video data is encoded into a predetermined format by the image processing unit 204. After that, the encoded content data is transmitted to the server apparatus 300 via the communication unit 205 in units of a predetermined time or in units of a predetermined amount of data.

In step S507, the CPU 201 determines whether to end live streaming, for example, in response to an operation performed by the streamer via the operation unit 209. If it is determined not to end live streaming (FALSE in step S507), the CPU 201 advances the processing to step S508.

In step S508, the CPU 201 determines whether, currently, there has been social tipping from a viewer with respect to content which is being streamed. Specifically, the CPU 201 determines that there has been social tipping, for example, by receiving information about social tipping from the server apparatus 300 or by receiving information about social tipping as a result of inquiring of the server apparatus 300. If it is determined that information about social tipping has been received (TRUE in step S508), the CPU 201 advances the processing to step S509.

In step S509, the CPU 201 displays, on the display unit 207, the amount of social tipping included in the received information about social tipping in such a way as to enable the streamer to recognize the monetary value of social tipping. At this time, the CPU 201 also displays, on the display unit 207, user account information and comments (messages) of a viewer who has performed social tipping, included in the information about social tipping. Furthermore, in a case where the CPU 201 has received information about social tipping from a plurality of (many and unspecified) viewers, the CPU 201 displays the amount of social tipping on the display unit 207 each time the CPU 201 receives information about social tipping. At this time, the CPU 201 directly displays the amount of social tipping on the display unit 207 in a single uniform way irrespective of which viewer has performed social tipping. Accordingly, the streamer is able to visually recognize, in real time, from which viewer there has been a support by what amount of social tipping, and is, therefore, able to immediately perform feedback for gratitude for social tipping.

If the above-described processing in steps S507 to S509 is repeated and, in step S508, it is determined that information about social tipping has not been received (FALSE in step S508), the CPU 201 returns the processing to step S507. If, in step S507, it is determined to end live streaming (TRUE in step S507), the CPU 201 performs stopping and closing processing that is based on a predetermined procedure in each constituent component. Moreover, the CPU 201 transmits a request for ending of live streaming to the server apparatus 300, and then ends the processing in the flowchart of FIG. 5.

<Operation of Server Apparatus>

Figure 6:
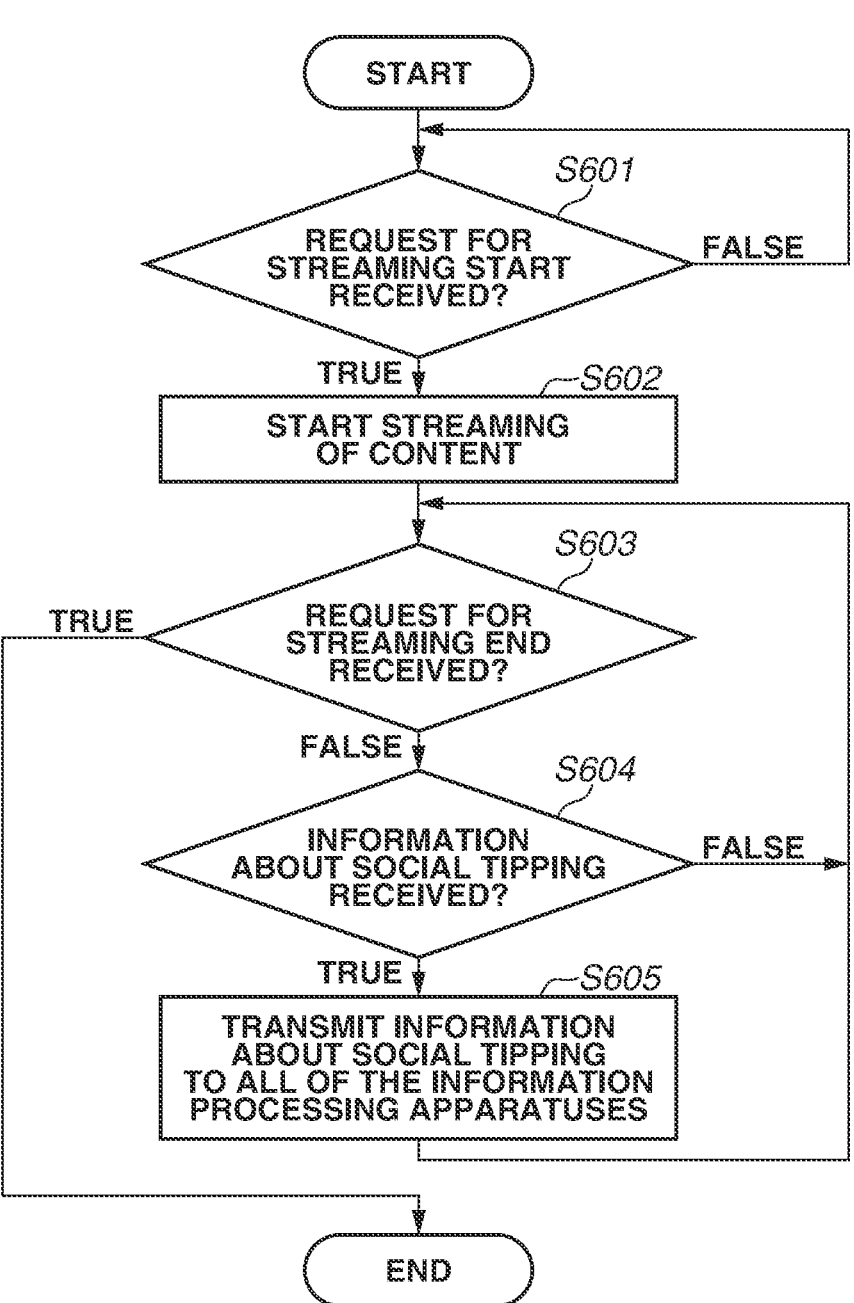
FIG. 6 is a flowchart illustrating an operation of the server apparatus in the first exemplary embodiment.

FIG. 6 is a flowchart illustrating an operation of the server apparatus 300 in the first exemplary embodiment.

The flowchart of FIG. 6 is implemented by the CPU 301 of the server apparatus 300 executing a program to control respective constituent components of the server apparatus 300.

In step S601, the CPU 301 determines whether a request for start of streaming has been received from the information processing apparatus for streamer 200. If it is determined that the request for start of streaming has been received (TRUE in step S601), the CPU 301 advances the processing to step S602, and, if it is determined that the request for start of streaming has not been received (FALSE in step S601), the CPU 301 waits for receiving the request for start of streaming.

In step S602, the CPU 301 starts live streaming of received content data at a content sharing website which operates on the server apparatus 300, from a channel established with a user account of the streamer from which the request for start of streaming has been received. At this time, the CPU 301 converts the received content data into a suitable data format with the image processing unit 303, and then performs live streaming of the converted content data.

In step S603, the CPU 301 determines whether a request for end of live streaming of content has been received from the information processing apparatus for streamer 200. If it is determined that the request for end of live streaming has not been received (FALSE in step S603), the CPU 301 advances the processing to step S604.

In step S604, the CPU 301 determines whether there is an input of social tipping from a viewer of the content and, thus, information about social tipping has been received from the information processing apparatus for viewer 400. Here, the method for receiving information about social tipping includes, for example, a method of performing polling as to whether information about social tipping has been received in units of a previously determined time and a method of issuing an interrupt notification to the CPU 301 at the time of reception of information about social tipping. The method for receiving information about social tipping can be any method unless information about social tipping is lost on the network, and is not particularly limited. If it is determined that information about social tipping has been received (TRUE in step S604), the CPU 301 advances the processing to step S605.

In step S605, the CPU 301 performs broadcast transmission of user account information, the amount of social tipping, and a comment of a viewer who has performed social tipping as a set of data to all of the viewers who are accessing a channel on which the content being streamed is provided.

If the above-described processing in steps S603 to S605 is repeated and, in step S604, it is determined that information about social tipping has not been received (FALSE in step S604), the CPU 301 returns the processing to step S603. If, in step S603, it is determined that the request for end of live streaming has been received (TRUE in step S603), the CPU 301 ends live streaming of the content, and then ends the processing in the flowchart of FIG. 6.

<Operation of Information Processing Apparatus for Viewer>

Figure 7:
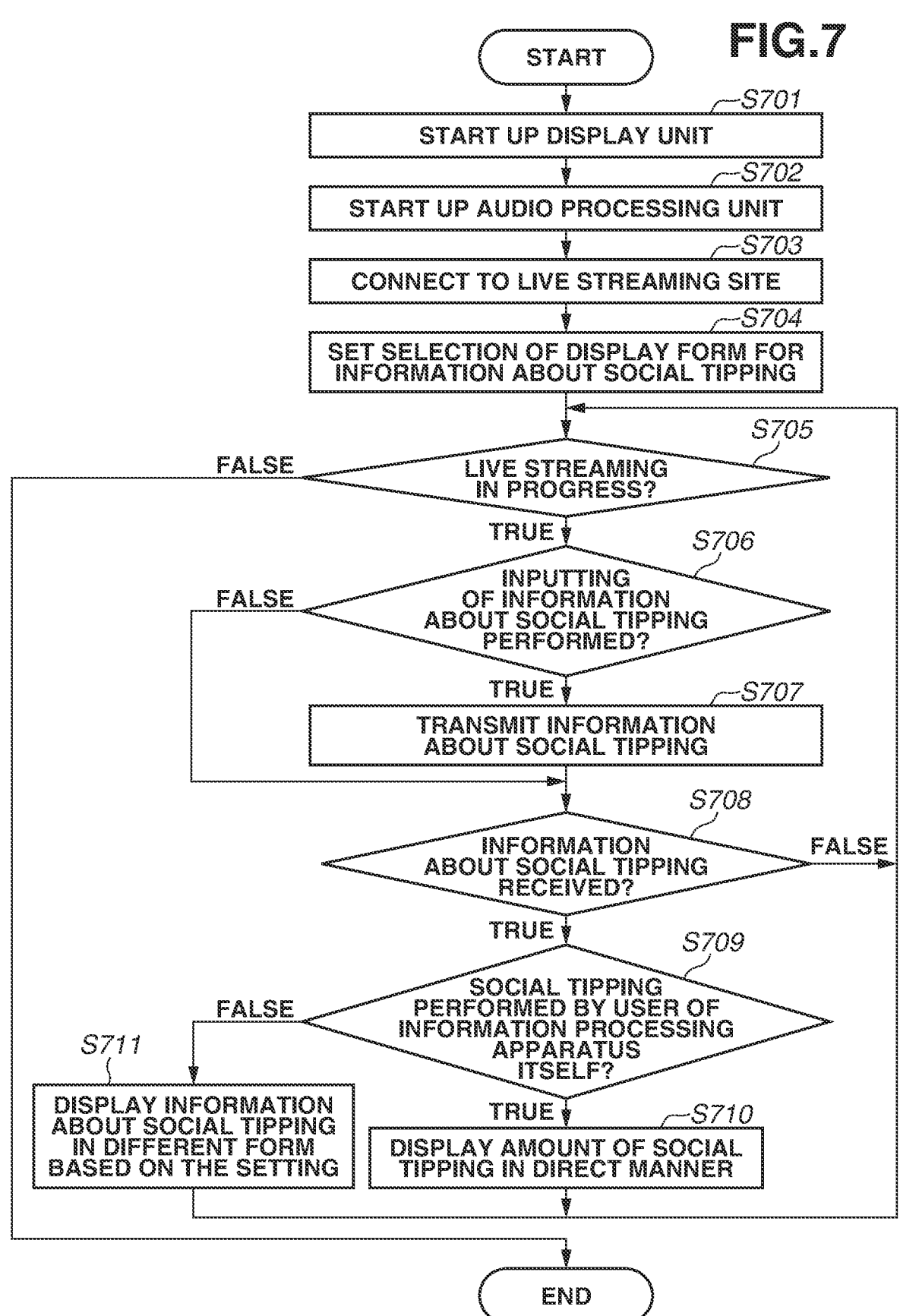
FIG. 7 is a flowchart illustrating an operation of the information processing apparatus for viewer in the first exemplary embodiment.

FIG. 7 is a flowchart illustrating an operation of the information processing apparatus for viewer 400 in the first exemplary embodiment.

The flowchart of FIG. 7 is implemented by the CPU 401 of the information processing apparatus for viewer 400 executing a program to control respective constituent components of the information processing apparatus for viewer 400.

In step S701, the CPU 401 starts up the display unit 406 in response to an operation performed via the operation unit 408 by the viewer.

In step S702, the CPU 401 starts up the audio processing unit 407 in response to an operation performed via the operation unit 408 by the viewer. Here, the viewer makes preparations for an output operation for video data and audio data of content subjected to live streaming.

In step S703, the CPU 401 connects to the Internet via the communication unit 404 and selects a streaming channel desired to be viewed by the viewer, by accessing to a web-based video sharing site which the server apparatus 300 provides or by launching a dedicated application.

In step S704, the CPU 401 causes the user of the information processing apparatus for viewer 400 (also referred to as the "own user", i.e., a first user) to select a form in which to display information about social tipping which a viewer other than the own user (i.e., a second user of another information processing apparatus for viewer 400, also referred to as the "other user") has performed, when the own user views content on the selected channel, and sets the selected form.

Here, the user of the information processing apparatus for viewer 400 is able to select an identical output mode which outputs the amount of social tipping performed by the own user and the amount of social tipping performed by the other user in an identical form and a different output mode which outputs the amount of social tipping performed by the own user and the amount of social tipping performed by the other user in respective different forms. In a case where the different output mode has been selected, the CPU 401 displays the amount of social tipping performed by the own user in a direct manner and displays the amount of social tipping performed by the other user in an altered manner.

The different output mode includes a previously prepared plurality of types of different output modes (a first different output mode to a third different output mode). In each of the first different output mode to the third different output mode, the CPU 401 displays the amount of social tipping performed by the own user in a direct manner and hides the amount of social tipping performed by the other user.

The first different output mode is a mode which displays the amount of social tipping performed by the own user in a direct manner and displays the color of a sticker (display item) for displaying a comment included in information about social tipping performed by the other user with a coloration previously determined according to the amount of social tipping performed by the other user. For example, with regard to a comment made when a first range of amount of social tipping has been performed, the CPU 401 displays the comment with a sticker of a first color, with regard to a comment made when a second range of amount of social tipping has been performed, the CPU 401 displays the comment with a sticker of a second color, and, with regard to a comment made when a third amount or more of social tipping has been performed, the CPU 401 displays the comment with a sticker of a third color.

The second different output mode is a mode which displays the amount of social tipping performed by the own user in a direct manner and replaces the amount of social tipping performed by the other user with an icon image (display item) previously determined according to the amount of social tipping performed by the other user and displays the icon image. For example, with regard to a first range of amount of social tipping, the CPU 401 replaces information about the amount of social tipping with a first icon image and displays the first icon image, with regard to a second range of amount of social tipping, the CPU 401 replaces information about the amount of social tipping with a second icon image and displays the second icon image, and, with regard to a third amount or more of social tipping, the CPU 401 replaces information about the amount of social tipping with a third icon image and displays the third icon image.

The third different output mode is a mode which displays the amount of social tipping performed by the own user in a direct manner and changes the size of an identical icon image (display item) or the number of identical icon images according to the amount of social tipping performed by the other user and displays the changed icon image or images. For example, with regard to a first range of amount of social tipping, the CPU 401 displays the icon image in a small size or displays one icon image, with regard to a second range of amount of social tipping, the CPU 401 displays the icon image in a medium size or displays two icon images, and, with regard to a third amount or more of social tipping, the CPU 401 displays the icon image in a large size or displays three icon images. Furthermore, with regard to the size of an icon image or the number of icon images, as the amount of social tipping is larger, the CPU 401 only needs to display the icon image in a larger size or display a larger number of icon images, so that the size of the icon image or the number of icon images is not limited.

In this way, in the first different output mode to the third different output mode, the CPU 401 displays information about social tipping performed by the other user in different forms according to the value of social tipping.

Moreover, in step S704, the CPU 401 causes the own user to select a form for limiting a screen output of a comment included in the information about social tipping performed by the other user, and sets the selected form.

Here, the own user is able to select a non-limitation mode which does not limit a comment included in information about social tipping performed by the other user and a limitation mode which limits a comment included in information about social tipping performed by the other user. If the limitation mode has been selected, the CPU 401 displays a comment included in information about social tipping performed by the own user in a direct manner, and alters a comment included in information about social tipping performed by the other user and displays the altered comment.

The limitation mode includes a prepared plurality of types of limitation modes (a first limitation mode to a third limitation mode).

The first limitation mode is a mode which masks and hides the entirety of any comment included in information about social tipping performed by the own user. Here, in a case where the other user has made a comment without performing social tipping, even such a comment is displayed. However, the CPU 401 can be configured to hide any comment made by the other user in a single uniform way regardless of whether the other user performs social tipping.

The second limitation mode is a mode which, among comments made by the other users, displays any comment included in information about social tipping the amount of which is greater than or equal to a predetermined amount (greater than or equal to a predetermined value) and hides any comment included in information about social tipping the amount of which is less than the predetermined amount (less than the predetermined value). Moreover, the second limitation mode can be a mode which, among comments made by the other users, displays any comment included in information about social tipping the amount of which is less than or equal to a predetermined amount (less than or equal to a predetermined value) and hides any comment included in information about social tipping the amount of which is greater than the predetermined amount (greater than the predetermined value). Furthermore, the amount less than the predetermined amount or the value less than or equal to the predetermined amount can be set to include or can be set not to include a case where the amount is "0", i.e., the other user has made only a comment without performing social tipping. Moreover, the second limitation mode can be a mode which displays only any comment included in information about social tipping the amount of which is less than or equal to a first amount (less than or equal to a first value) and greater than or equal to a second amount (greater than or equal to a second value, the first value being greater than the second value). In this case, the CPU 401 hides any comment included in information about social tipping the amount of which is greater than the first amount and any comment included in information about social tipping the amount of which is less than the second amount.

The third limitation mode is a mode which, among comments made by the other users, displays any comment included in information about social tipping performed by the other user up to a predetermined number of other users and does not display any comment included in information about social tipping performed by the other user exceeding the predetermined number of other users. Furthermore, the other user in which the amount of social tipping is "0", i.e., the other user who has made only a comment without performing social tipping, can be set to be included or can be set not to be included in the number of other users.

The CPU 401 sets a mode selected by the own user prior to content being viewed.

Furthermore, with regard to selection settings, the identical output mode, which outputs the amounts of social tipping in an identical form, and the non-limitation mode, which does not limit comments, can be set by default, or the different output mode and the limitation mode can be set by default.

In step S705, the CPU 401 determines whether live streaming of content on the selected channel is in progress. For example, when the streamer for the content has ended streaming or when the viewer (own user) has switched to another channel, has severed a connection to a content sharing site, or has ended a dedicated application, live streaming ends. If it is determined that the live streaming is in progress (TRUE in step S705), the CPU 401 advances the processing to step S706.

In step S706, the CPU 401 determines whether the viewer (own user) has performed inputting of social tipping via the operation unit 408. In the case of performing social tipping, the viewer inputs the amount of social tipping and further inputs a comment as needed. If it is determined that the viewer (own user) is only viewing content (FALSE in step S706), the CPU 401 advances the processing to step S708, and, if it is determined that the viewer has performed inputting of social tipping (TRUE in step S706), the CPU 401 advances the processing to step S707.

In step S707, the CPU 401 combines the input amount of social tipping and the input comment into a set of social tipping information and transmits the set of social tipping information to the server apparatus 300.

In step S708, the CPU 401 determines whether there has been social tipping from a viewer with respect to content which is being streamed. Specifically, when the CPU 401 has received information about social tipping from the server apparatus 300 or when, as a result of inquiring of the server apparatus 300, the CPU 401 has received information about social tipping, the CPU 401 determines that there has been social tipping from a viewer. Here, the social tipping from a viewer includes social tipping from all of the viewers irrespective of whether the viewer is the other user or the own user. If it is determined that information about social tipping has been received (TRUE in step S708), the CPU 401 advances the processing to step S709, and, if it is determined that information about social tipping has not been received (FALSE in step S708), the CPU 401 returns the processing to step S705.

In step S709, the CPU 401 determines whether the received information about social tipping is information about social tipping performed by the user themself (own user). In a case where user account information included in the received information about social tipping and user account information about the user themself coincide with each other, the CPU 401 determines that the received information about social tipping is information about social tipping performed by the user themself (own user). If it is determined that the received information about social tipping is information about social tipping performed by the user themself (TRUE in step S709), the CPU 401 advances the processing to step S710, and, if it is determined that the received information about social tipping is information about social tipping performed by the other user (FALSE in step S709), the CPU 401 advances the processing to step S711.

In step S710, the CPU 401 displays the amount of social tipping in a direct manner on the display unit 406 based on the received information about social tipping. Moreover, in a case where a comment is included in the received information about social tipping, the CPU 401 displays the comment in a direct manner on the display unit 406. Accordingly, on the display unit 406, the amount of social tipping performed by the own user and the comment made by the own user are displayed in combination in a direct manner.

In step S711, the CPU 401 displays the information about social tipping based on setting information for the mode selected by the own user prior to viewing being performed. For example, in a case where the first different output mode is currently set, the CPU 401 displays the color of a sticker with a coloration previously determined according to the amount of social tipping performed by the other user. Moreover, in a case where the first limitation mode is currently set, the CPU 401 masks and hides the entirety of any comment included in information about social tipping. Accordingly, on the display unit 406, not only is content displayed, information about social tipping performed by the other user is displayed in a form different from the form for information about social tipping performed by the own user.

Furthermore, if, in step S705, it is determined that live streaming has been ended (FALSE in step S705), the CPU 401 ends the processing in the flowchart of FIG. 7.

<Display Examples of the Amount of Social Tipping>

Figure 8A:
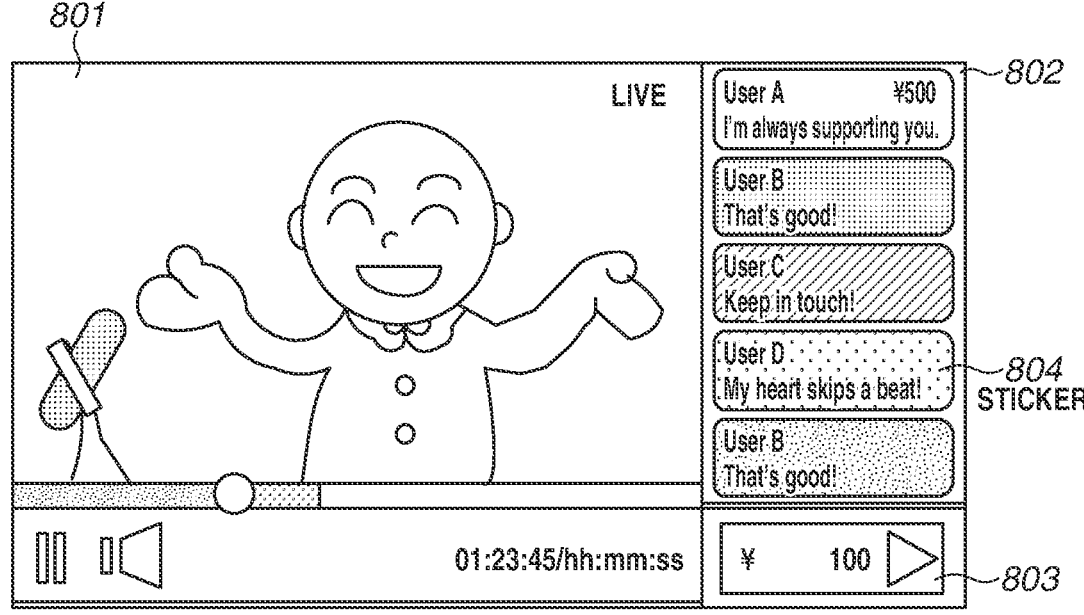
FIGS. 8A, 8B, and 8C are diagrams illustrating display examples of displaying pieces of information about social tipping in respective different forms.
Figure 8B:
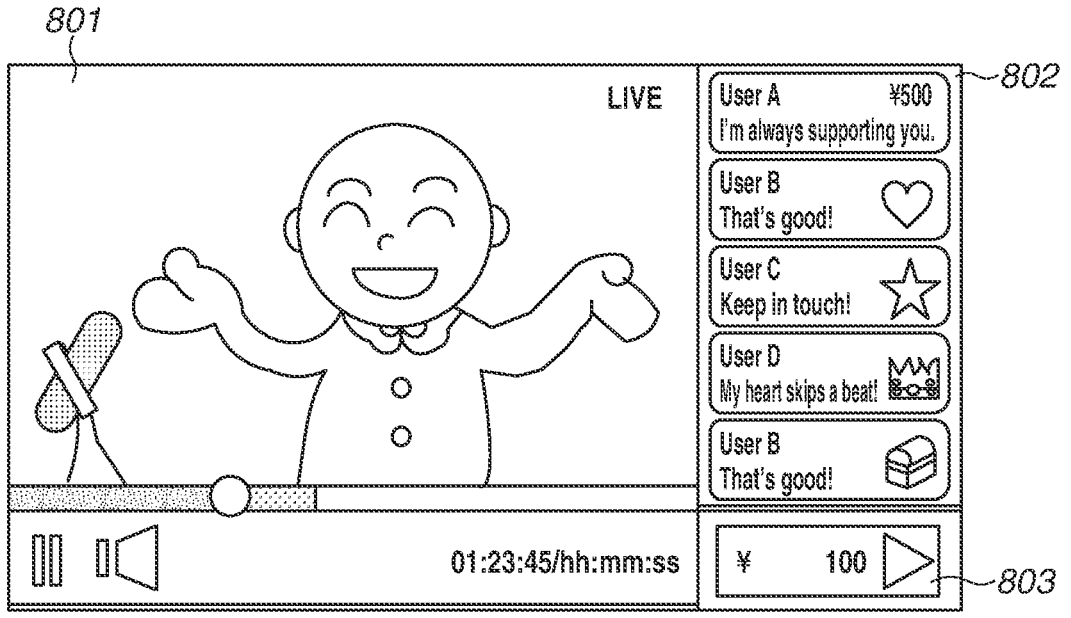
Figure 8C:
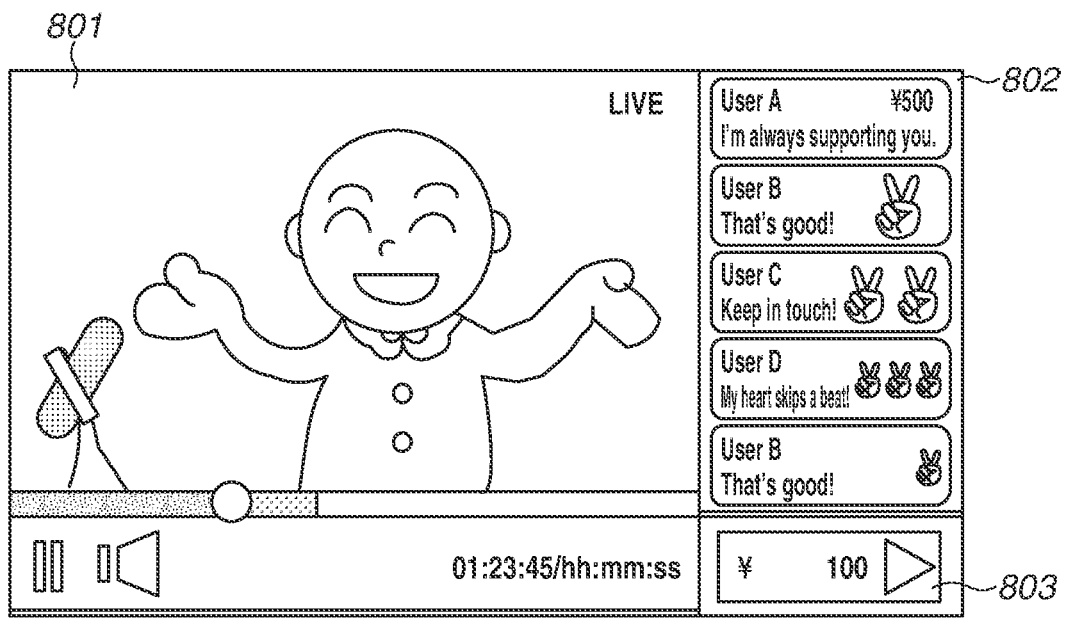

FIGS. 8A, 8B, and 8C are diagrams each illustrating a display example of displaying information about social tipping performed by the own user and information about social tipping performed by the other user in respective different forms. In a screen for content which is displayed on the display unit 406, a content display field 801, a comment output field 802, and a social tipping input field 803 are displayed.

The content display field 801 is a field in which, mainly, content which is being streamed is displayed. The comment output field 802 is a field in which pieces of information about social tipping from many and unspecified viewers who are viewing the content are displayed in chronological order from top to bottom. Furthermore, an account name "User A" in the comment output field 802 is equivalent to the own user. The comment output field 802 is allowed to be scrolled in the vertical direction. The social tipping input field 803 is a field used for the viewer (own user) to input the amount of social tipping and a comment.

FIG. 8A is a diagram illustrating a display example for a case where the first different output mode has been set.

Since the first different output mode is currently set, the color of a sticker 804 for displaying a comment included in information about social tipping performed by the other user is displayed with a coloration determined according to the amount of social tipping performed by the other user.

Here, the amount of social tipping performed by the own user (User A) is displayed in a direct manner, and the amounts of social tipping performed by the other users are hidden. Moreover, the colors of stickers 804 for displaying comments made by the other users (Users B, C, and D) are displayed with respective different colorations.

Moreover, with regard to the User B, while social tipping has been performed twice in a timeline period of the comment output field 802, since the colors of the respective stickers 804 are different from each other, although it is impossible to understand an accurate amount of social tipping, it can be inferred that the amount of social tipping has been changed.

FIG. 8B is a diagram illustrating a display example for a case where the second different output mode has been set.

Since the second different output mode is currently set, the amount of social tipping performed by the other user is replaced with an icon image previously determined according to the amount of social tipping performed by the other user, and the icon image is then displayed.

Here, the social tipping performed the first time by the User B is displayed with a heart mark icon, the social tipping performed by the User C is displayed with a star mark icon, the social tipping performed by the User D is displayed with a crown mark icon, and the social tipping performed the second time by the User B is displayed with a treasure box mark icon.

FIG. 8C is a diagram illustrating a display example for a case where the third different output mode has been set.

Since the third different output mode is currently set, the size of an identical icon image or the number of identical icon images is changed according to the amount of social tipping performed by the other user, and the changed icon image or images are displayed.

Here, based on a peace sign mark icon image (V sign mark icon image), the size of the icon image or the number of icon images is changed according to the amount of social tipping, and the changed icon image or images are displayed.

<Display Examples of a Comment included in Information about Social Tipping>

FIGS. 9A, 9B, 9C, and 9D are diagrams each illustrating a display example of displaying a comment included in information about social tipping. Furthermore, screen constituent components similar to those illustrated in FIGS. 8A to 8C are omitted from description as appropriate.

Figure 9A:
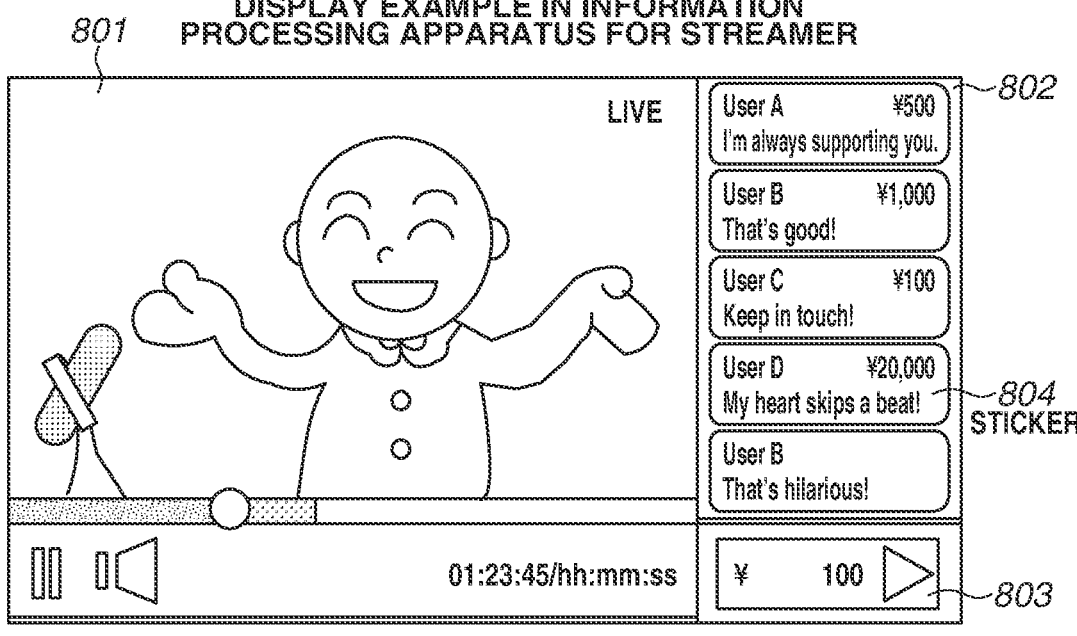
FIGS. 9A, 9B, 9C, and 9D are diagrams illustrating display example of displaying comments included in respective different pieces of information about social tipping.

FIG. 9A is a diagram illustrating a display example which is displayed on the display unit 207 of the information processing apparatus for streamer 200. On the display unit 207 of the information processing apparatus for streamer 200, the amounts of social tipping performed by all of the viewers and comments included in the respective pieces of information about social tipping are displayed in the comment output field 802 in a single uniform way without being restricted.

With regard to the streamer's position, if the amounts of social tipping or comments are displayed while being restricted, the streamer becomes unable to pick up comments or understand the amounts of social tipping, and, therefore, it is desirable to perform setting which does not put a restriction.

Figure 9B:
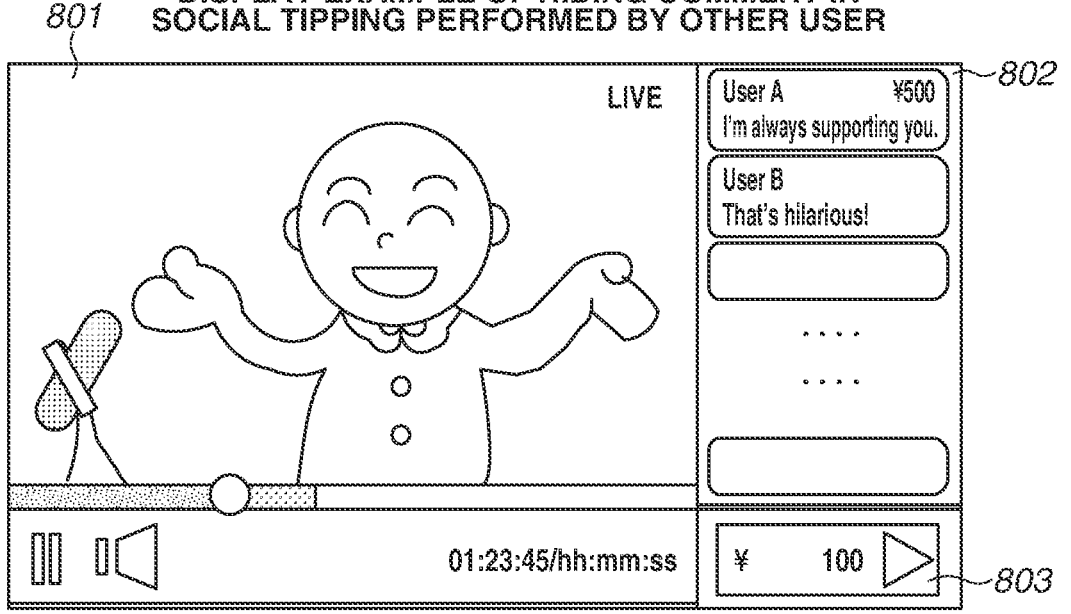

FIG. 9B is a diagram illustrating a display example which is displayed on the display unit 406 of the information processing apparatus for viewer 400 when the first limitation mode has been set.

Since the first limitation mode is currently set, all of the comments included in pieces of information about social tipping performed by the other users are masked.

Here, only a comment of the User A (own user) and a comment of the User B, who has not performed social tipping, are displayed. Accordingly, updating of the comment output field 802 becomes slow, and, therefore, the own user becomes able to easily scan comments of the other users.

Figure 9C:
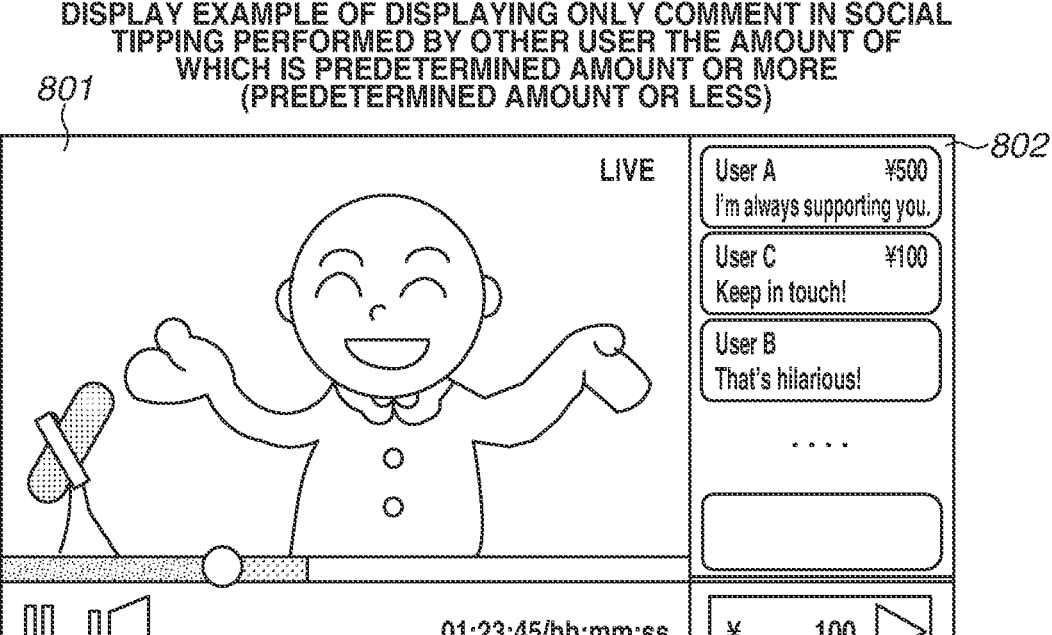

FIG. 9C is a diagram illustrating a display example which is displayed on the display unit 406 of the information processing apparatus for viewer 400 when the second limitation mode has been set.

Since the second limitation mode is currently set, among comments of the other users, comments included in pieces of information about social tipping the amount of which is greater than a predetermined amount are hidden.

Here, a comment of the User D, who has performed a high amount of social tipping, is hidden. Accordingly, for example, a viewer who feels uncomfortable about a comment of the other user who performs only a high amount of social tipping causes the comment of the other user to be hidden, and thus becomes able to perform viewing in a comfortable way. On the other hand, in the case of hiding a comment included in information about social tipping the amount of which is less than a predetermined amount, a viewer who feels uncomfortable about a comment of the other user who successively performs a low amount of social tipping causes the comment of the other user to be hidden, and thus becomes able to perform viewing in a comfortable way.

Figure 9D:
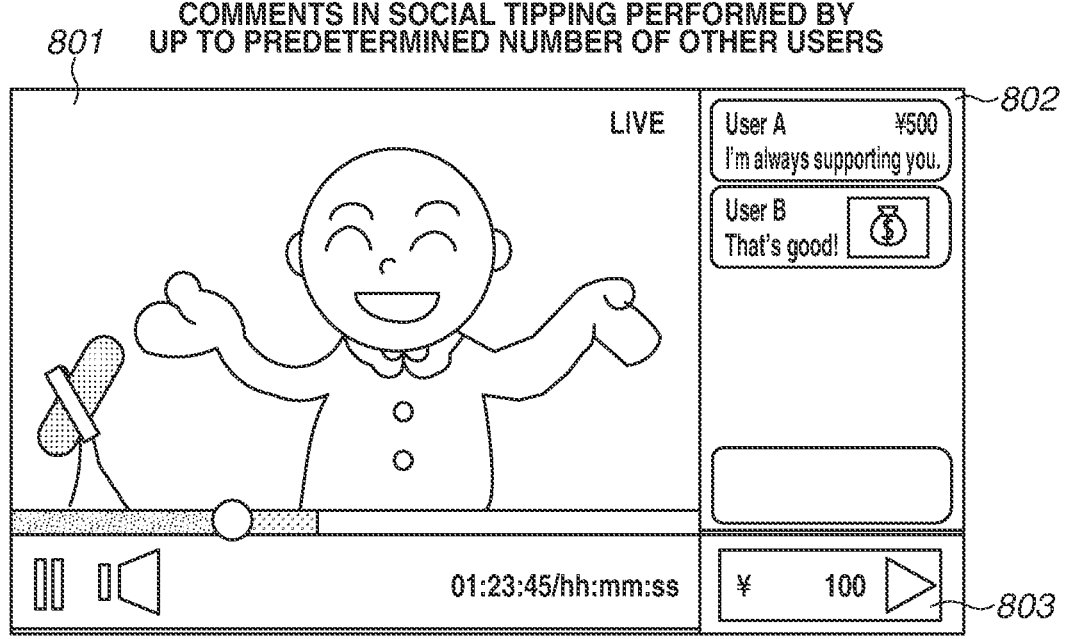

FIG. 9D is a diagram illustrating a display example which is displayed on the display unit 406 of the information processing apparatus for viewer 400 when the third limitation mode has been set.

Since the third limitation mode is currently set, among comments of the other users, only comments included in pieces of information about social tipping performed by the other users up to a predetermined number of other users are displayed.

Here, since one other user other than the own user is set as the predetermined number of other users in an updating period of the comment output field 802, only a comment included in information about social tipping performed by the User B is displayed.

While, with regard to FIGS. 8A to 8C and FIGS. 9B to 9D, display examples each of which is displayed on the display unit 406 based on only one setting have been described, the present exemplary embodiment is not limited to this case, and the respective different output modes can be combined as appropriate to perform displaying or the respective limitation modes can be combined as appropriate to perform displaying. Moreover, some of the respective different output modes and some of the respective limitation modes can be combined as appropriate to perform displaying.

In this way, according to the first exemplary embodiment, the amount of social tipping performed by the own user and the amount of social tipping performed by the other user are displayed in respective different forms, so that it is possible to make it difficult to compare the social tipping performed by the own user and the social tipping performed by the other user with each other. Accordingly, since it is possible to prevent or reduce excessive competition from the other user, it is possible to prevent a money-related trouble before it happens while maintaining a healthy interactivity between a streamer and a viewer concerning social tipping.

Furthermore, while, in the above-described exemplary embodiment, as a different output mode which outputs the amount of social tipping performed by the own user and the amount of social tipping performed by the other user in respective different forms, the first different output mode to the third different output mode have been described, another different output mode can be additionally provided.

For example, a fourth different output mode is a mode which displays the amount of social tipping performed by the own user in a direct manner and replaces the amount of social tipping performed by the other user with a sound preliminarily determined according to the amount of social tipping performed by the other user and outputs the sound. In the fourth different output mode, the user of the information processing apparatus for viewer 400 is able to change at least one of the type of sound or the volume of sound according to the amount of social tipping.

Specifically, with regard to social tipping the amount of which is within a first range in amount, the CPU 401 replaces information about the amount of social tipping with a first sound and outputs the first sound, with regard to social tipping the amount of which is within a second range in amount, the CPU 401 replaces information about the amount of social tipping with a second sound and outputs the second sound, and, with regard to social tipping the amount of which is greater than or equal to a third amount, the CPU 401 replaces information about the amount of social tipping with a third sound and outputs the third sound. Moreover, with regard to social tipping the amount of which is within a first range in amount, the CPU 401 can be configured to output a predetermined sound at low volume, with regard to social tipping the amount of which is within a second range in amount, the CPU 401 can be configured to output the predetermined sound at medium volume, and, with regard to social tipping the amount of which is greater than or equal to a third amount, the CPU 401 can be configured to output the predetermined sound at high volume.

Here, the first sound to the third sound or the predetermined sound is supposed to be sound effects which form an impression of monetary value, such as "clang" or "clank", but is not particularly limited. Moreover, some of the respective different output modes can be combined as appropriate to perform outputting.

In the above-described first exemplary embodiment, a case where the streamer performs, in real time, live streaming of content generated by the information processing apparatus for streamer 200 in a direct manner and takes care of social tipping performed by the viewer has been described. In a second exemplary embodiment, a case where the streamer performs archive streaming of content generated by the information processing apparatus for streamer 200 and takes care of social tipping performed by the viewer is described.

<System Configuration>

Figure 10:
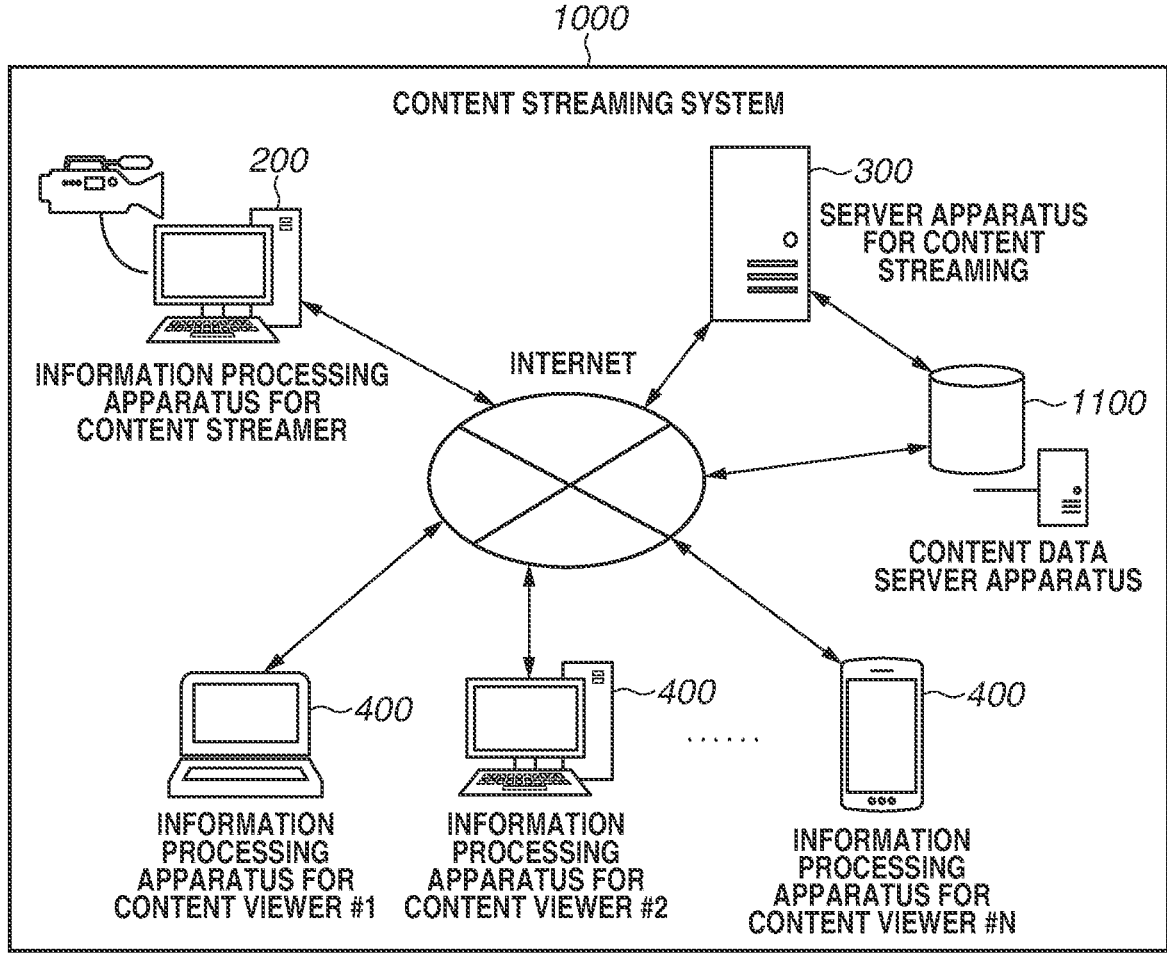
FIG. 10 is a diagram illustrating a configuration of an information processing system in a second exemplary embodiment.

FIG. 10 is a diagram illustrating a configuration of a content streaming system 1000 serving as an information processing system in the second exemplary embodiment. Furthermore, constituent components similar to those in the first exemplary embodiment are assigned the respective same reference characters as those in the first exemplary embodiment, and are omitted from description as appropriate.

The content streaming system 1000 includes an information processing apparatus for streamer 200, a server apparatus 300, information processing apparatuses for viewer 400, and a content data server apparatus 1100. The content streaming system 1000 in the second exemplary embodiment is a system obtained by adding the content data server apparatus 1100 to the content streaming system 100 in the first exemplary embodiment.

<Configuration of Content Data Server Apparatus>

Figure 11:
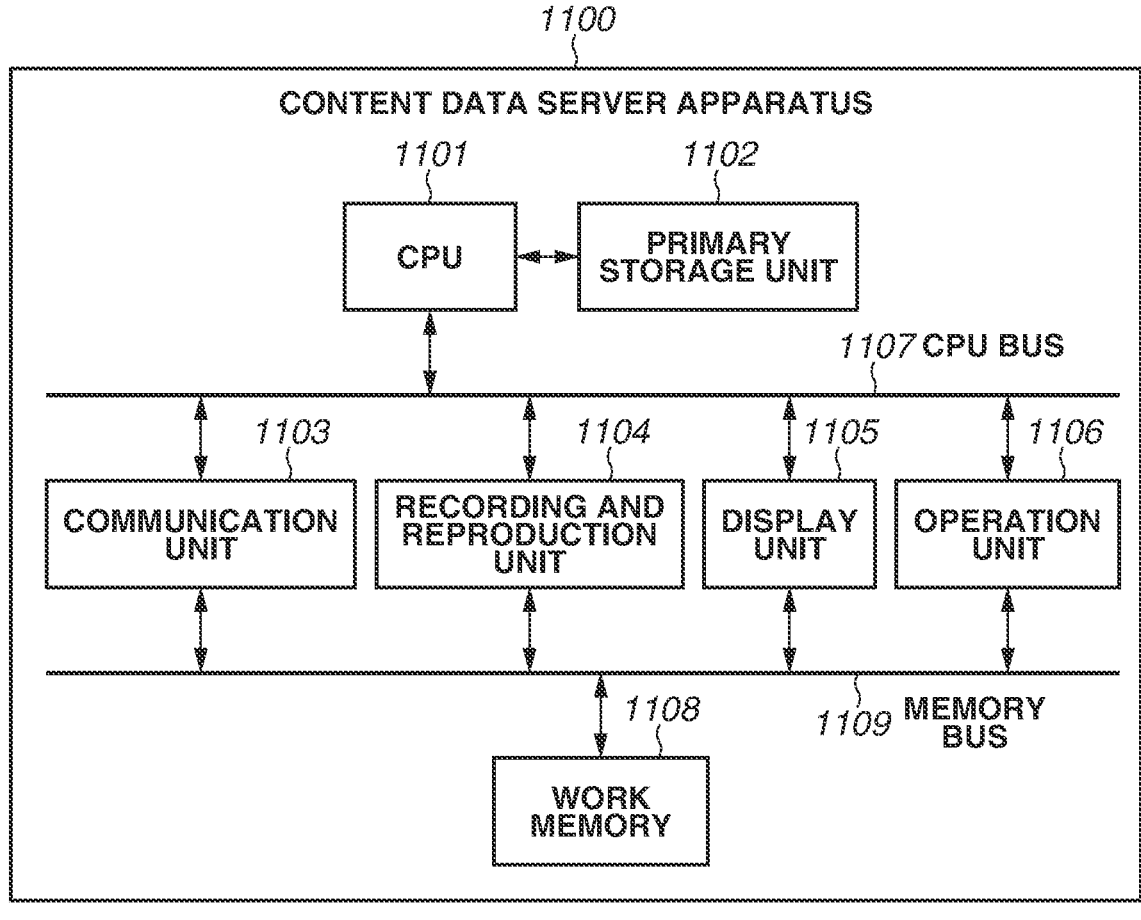
FIG. 11 is a diagram illustrating an example of a hardware configuration of a content data server apparatus in the second exemplary embodiment.

FIG. 11 is a diagram illustrating an example of a configuration of the content data server apparatus 1100.

The content data server apparatus 1100 includes, for example, a CPU 1101, a primary storage unit 1102, a communication unit 1103, a recording and reproduction unit 1104, a display unit 1105, an operation unit 1106, a CPU bus 1107, a work memory 1108, and a memory bus 1109.

The CPU 1101 performs, for example, start-up, stoppage, and interrupt notification of the communication unit 1103, the recording and reproduction unit 1104, the display unit 1105, and the operation unit 1106 via the CPU bus 1107, thus controlling various operations of the content data server apparatus 1100. The CPU 1101 implements various functions which the content data server apparatus 1100 provides, by loading and executing a program stored in, for example, the primary storage unit 1102, the work memory 1108, or the recording and reproduction unit 1104.

The primary storage unit 1102 is a storage region which is used as, for example, a work area for the CPU 1101. A specific configuration of the primary storage unit 1102 is similar to that of the primary storage unit 302 of the server apparatus 300 in the first exemplary embodiment.

The communication unit 1103 is an interface which connects the content data server apparatus 1100 to an external apparatus. The content data server apparatus 1100 uses the communication unit 1103 to perform transmission and reception of various pieces of information or various pieces of data between the content data server apparatus 1100 and an external apparatus. Furthermore, a specific network configuration is similar to that of the information processing apparatus for streamer 200 and is, therefore, omitted from description.

The content data server apparatus 1100 has, with use of the communication unit 1103, the function of receiving content data transmitted from the information processing apparatus for streamer 200 and the function of transmitting content data read out from the recording and reproduction unit 1104 to the server apparatus 300.

The recording and reproduction unit 1104 records and retains various pieces of data on a non-volatile recording medium, and reads out data from the recording medium at required timing. In the second exemplary embodiment, the recording and reproduction unit 1104 handles mainly content data for streaming. Moreover, the recording and reproduction unit 1104 can be configured to store program code which the CPU 1101 executes, and is able to be also used for reading-out or writing applications for a program the frequency of access to which is not so high compared with the primary storage unit 1102 or the work memory 1108. A specific configuration of the recording and reproduction unit 1104 is similar to that of the recording and reproduction unit 305 of the server apparatus 300 in the first exemplary embodiment.

The display unit 1105 is an output interface which displays various pieces of information to a user with administrator rights who operates the content data server apparatus 1100, and displays display information indicating, for example, an image on a screen. A display monitor device, such as an organic EL display or an LCD, can be used as the display unit 1105.

The operation unit 1106 is an input interface which receives an instruction from a user with administrator rights for the content data server apparatus 1100. The operation unit 1106 to be used is, for example, a keyboard, a pointing device, or a touch panel.

Furthermore, if the content data server apparatus 1100 includes, for example, a unit which enables the user to acquire information stored in the content data server apparatus 1100 and visually recognize the acquired information, by remote desktop connection via the communication unit 1103, the content data server apparatus 1100 does not need to include the display unit 1105. Moreover, if the content data server apparatus 1100 includes, for example, an input interface unit which enables the user to control the content data server apparatus 1100, the content data server apparatus 1100 does not need to include the operation unit 1106. In a case where the content data server apparatus 1100 does not include the display unit 1105 and the operation unit 1106, the content data server apparatus 1100 does not need to have a control function which controls operations of the respective constituent components.

The CPU bus 1107 is assumed to have the same configuration as that of the CPU bus 210 of the information processing apparatus for streamer 200 and have a function similar to that thereof.

The work memory 1108 is used for storage as a temporarily work area, and, as with the primary storage unit 1102, for example, a DRAM or an SRAM is used therefor. The work memory 1108 stores, for example, data which the communication unit 1103 has received from an external apparatus and data which is to be output by the display unit 1105.

The memory bus 1109 is assumed to have the same configuration as that of the memory bus 212 of the information processing apparatus for streamer 200 and have a function similar to that thereof.

<Operation of Information Processing Apparatus for Streamer>

Figure 12:
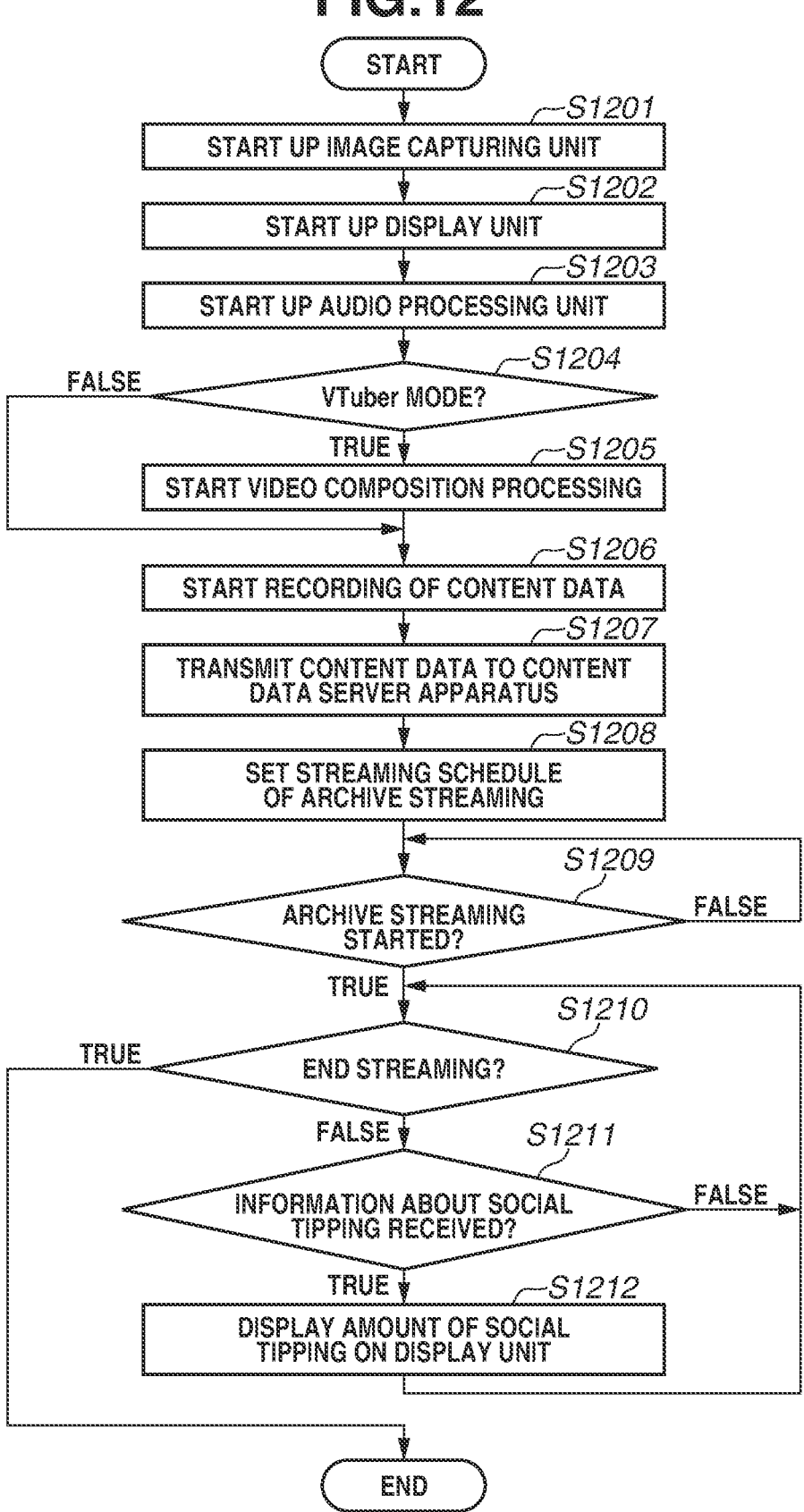
FIG. 12 is a flowchart illustrating an operation of an information processing apparatus for streamer in the second exemplary embodiment.

FIG. 12 is a flowchart illustrating an operation of the information processing apparatus for streamer 200 in the second exemplary embodiment. Furthermore, in the flowchart of FIG. 12, processing operations similar to those in the flowchart of FIG. 5 are omitted from description as appropriate.

Processing operations in steps S1201 to S1205 are similar to those in steps S501 to S505.

In step S1206, the CPU 201 starts recording of content data for archive streaming. Furthermore, the CPU 201 temporarily stores content data for archive streaming in a recording medium included in the recording and reproduction unit 206.

In step S1207, the CPU 201 transmits a recording request for content data for archive streaming to the content data server apparatus 1100 and also transmits the temporarily stored content data to the content data server apparatus 1100 via the Internet.

In step S1208, the CPU 201 performs, based on an operation performed by the streamer, setting of scheduled date and time of streaming of the archived content data by transmitting the setting to the server apparatus 300, and transmits a request for execution reservation of archive streaming to the server apparatus 300. The request for execution reservation of archive streaming includes a streaming request for streaming content data for archive streaming.

In step S1209, the CPU 201 determines whether archive streaming which has been set to the server apparatus 300 has been started. If it is determined that the archive streaming has been started (TRUE in step S1209), the CPU 201 advances the processing to step S1210, and, if it is determined that the archive streaming has not yet been started (FALSE in step S1209), the CPU 201 waits until the archive streaming has been started.

Processing operations in steps S1210 to S1212 are similar to those in steps S507 to S509.

<Operation of Content Data Server Apparatus>

Figure 13:
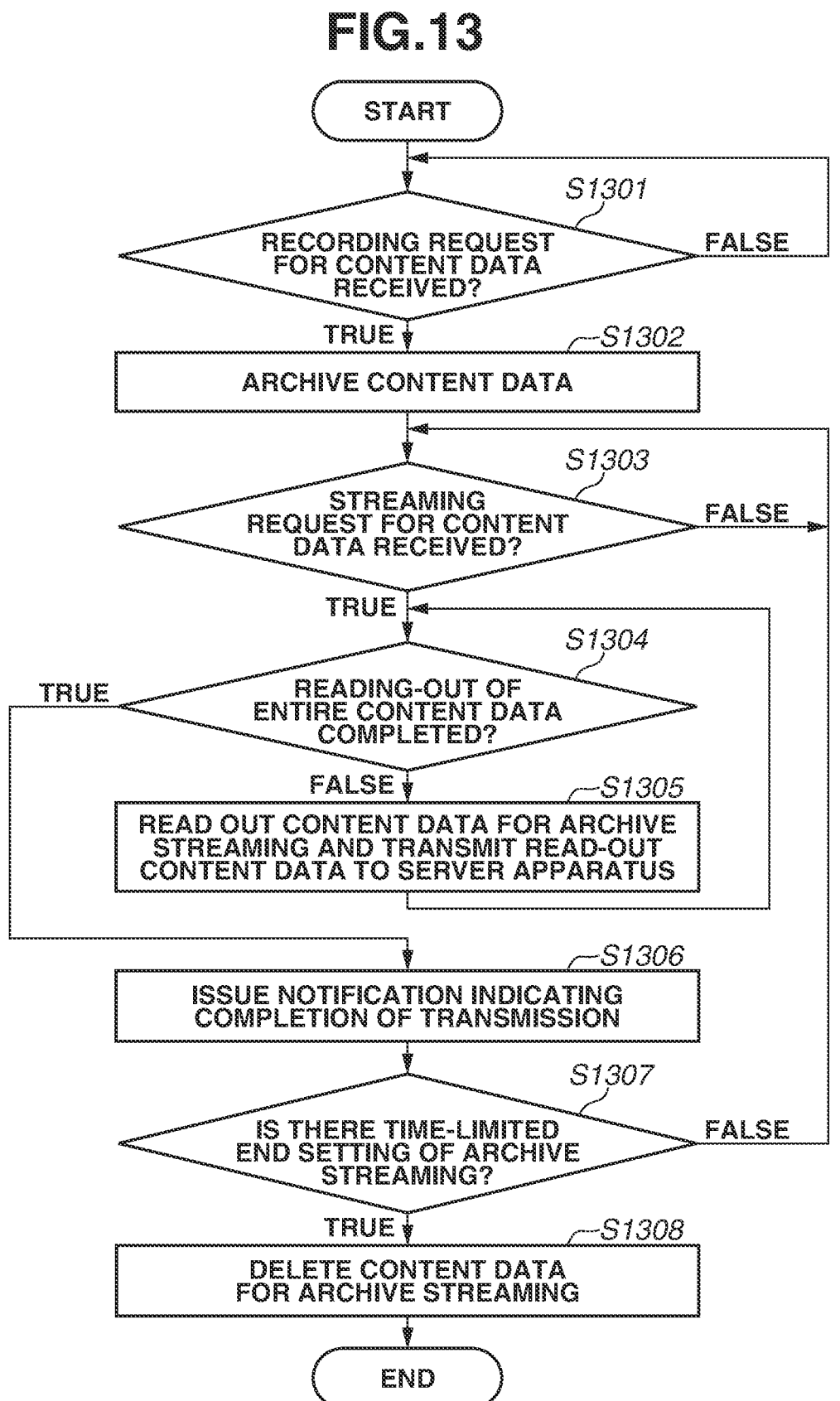
FIG. 13 is a flowchart illustrating an operation of the content data server apparatus in the second exemplary embodiment.

FIG. 13 is a flowchart illustrating an operation of the content data server apparatus 1100 in the second exemplary embodiment.

The flowchart of FIG. 13 is implemented by the CPU 1101 of the content data server apparatus 1100 executing a program to control the respective constituent components of the content data server apparatus 1100.

In step S1301, the CPU 1101 determines whether a recording request for content data for archive streaming has been received from the information processing apparatus for streamer 200. If it is determined that the recording request has been received (TRUE in step S1301), the CPU 1101 advances the processing to step S1302, and, if it is determined that the recording request has not yet been received (FALSE in step S1301), the CPU 1101 waits for receiving the recording request.

In step S1302, the CPU 1101 receives content data for archive streaming generated by the information processing apparatus for streamer 200 from the communication unit 1103 via the Internet, and archives the content data for archive streaming in a recording medium included in the recording and reproduction unit 1104. Furthermore, in a case where setting information concerning archiving of content data for archive streaming exists, the CPU 1101 acquires the setting information from the information processing apparatus for streamer 200. Here, the setting information concerning archiving is, for example, information including, for example, an archiving expiration date or an end setting such as the number of times of streaming.

In step S1303, the CPU 1101 determines whether a streaming request for streaming content data for archive streaming from the server apparatus 300 has been received.

If it is determined that the streaming request has been received (TRUE in step S1303), the CPU 1101 advances the processing to step S1304, and, if it is determined that the streaming request has not been received (FALSE in step S1303), the CPU 1101 waists until the streaming request is received.

In step S1304, the CPU 1101 starts reading out content data for archive streaming recorded on the recording and reproduction unit 1104 for the purpose of archive streaming, and determines whether the entire content data has been read out and the transmission thereof from the communication unit 1103 to the server apparatus 300 has been completed. If it is determined that the transmission thereof has been completed (TRUE in step S1304), the CPU 1101 advances the processing to step S1306, and, if it is determined that the transmission thereof has not yet been completed (FALSE in step S1304), the CPU 1101 advances the processing to step S1305.

In step S1305, the CPU 1101 continues reading out the content data for archive streaming recorded on the recording and reproduction unit 1104 and transmitting the content data from the communication unit 1103 to the server apparatus 300.

In step S1306, the CPU 1101 notifies the server apparatus 300 that the transmission of content data for archive streaming to be provided to viewers has been completed. With the notification set as a trigger, the CPU 1101 performs end processing of archive streaming. Furthermore, an apparatus connected to the network also performs processing for ending of archive streaming in a similar way.

In step S1307, the CPU 1101 determines whether there is a time-limited end setting of archive streaming when content data for archive streaming has been received. In a case where, in the above-mentioned step S1302, time-limited end setting of archive streaming has been received as setting information concerning archiving from the information processing apparatus for streamer 200, the CPU 1101 determines that there is a time-limited end setting of archive streaming. If it is determined that there is such end setting (TRUE in step S1307), the CPU 1101 advances the processing to step S1308. On the other hand, if it is determined that there is no such end setting (FALSE in step S1307), since content for archive streaming is able to be streamed any number of times in response to the streamer making a streaming request again, the CPU 1101 returns the processing to step S1303, thus repeating the above-described processing.

In step S1308, the CPU 1101 deletes content data for archive streaming from a recording medium included in the recording and reproduction unit 1104 based on the end setting. Furthermore, for example, in a case where the streamer wants to perform archive streaming only once, performing the above-mentioned time-limited end setting enables implementing rare or premium viewing as content.

<Operation of Server Apparatus>

FIG. 14 is a flowchart illustrating an operation of the server apparatus 300 in the second exemplary embodiment. Furthermore, in the flowchart of FIG. 14, processing operations similar to those in the flowchart of FIG. 6 are omitted from description as appropriate.

In step S1401, the CPU 301 determines whether a streaming request for streaming content data for archive streaming has been received from the information processing apparatus for streamer 200. If it is determined that the streaming request has been received (TRUE in step S1401), the CPU 301 advances the processing to step S1402, and, if it is determined that the streaming request has not been received (FALSE in step S1401), the CPU 301 waist until the streaming request is received.

In step S1402, the CPU 301 receives archive streaming setting information from the information processing apparatus for streamer 200. The archive streaming setting information includes, for example, user account information about a user who performs archive streaming, channel information, date and time information for performing archive streaming, and link or address information on the content data server apparatus 1100 in which archived streaming content is stored. Moreover, the archive streaming setting information can be included in the streaming request, or can be transmitted from the information processing apparatus for streamer 200 separately from the streaming request.

In step S1403, the CPU 301 compares the streaming scheduled date and time included in the archive streaming setting information and the current time acquired from a clocking unit included in the server apparatus 300 with each other and determines whether the date and time for starting archive streaming has been reached. If it is determined that the date and time for starting archive streaming has not yet been reached (FALSE in step S1403), the CPU 301 repeats processing in step S1403 at predetermined timing (for example, at intervals of one second) until such date and time has been reached. On the other hand, if it is determined that the date and time for starting archive streaming has been reached (TRUE in step S1403), the CPU 301 advances the processing to step S1404.

In step S1404, the CPU 301 refers to the archive streaming setting information acquired in step S1402 and then reads out predetermined content data for archive streaming from the content data server apparatus 1100.

In step S1405, the CPU 301 causes the image processing unit 303 to convert the read-out content data for archive streaming into a predetermined format as needed and then performs archive streaming toward viewers who are accessing the channel concerned.

Processing operations in steps S1406 to S1408 are similar to the processing operations in steps S603 to S605.

In this way, according to the second exemplary embodiment, even in the case of archive streaming, as with live streaming, it is possible to make it difficult to compare the social tipping performed by the own user and the social tipping performed by the other user with each other. Accordingly, since it is possible to prevent or reduce excessive competition from the other user, it is possible to prevent a money-related trouble before it happens while maintaining a healthy interactivity between a streamer and a viewer concerning social tipping.

In the above-described exemplary embodiments, a case where the streamer performs live streaming or archive streaming of content generated by the information processing apparatus for streamer 200 and takes care of social tipping performed by the viewer has been described. In a third exemplary embodiment, a case where the streamer performs streaming of audio-only content, such as voice chat or musical performance, generated by the information processing apparatus for streamer 200 and takes care of social tipping performed by the viewer is described.

<Configuration of Information Processing Apparatus for Streamer>

In the following description, among various constituent components of the information processing apparatus for streamer 200, constituent components having functions different from those described in the above-described exemplary embodiments are described.

The image processing unit 204 generates, by computer graphics, a background image, which is used at the time of streaming audio-only content, based on a result of analysis of audio data performed by the audio processing unit 208.

The audio processing unit 208 analyzes, in real time, audio data included in content generated by the streamer and classifies, for example, genres, melodies, rhythms, tempos, and musical instruments used. The audio processing unit 208 notifies the image processing unit 204 of the classification result via, for example, the CPU 201. Furthermore, the analysis of audio data to be used includes various known techniques such as frequency spectrum analysis, pattern matching, and inference processing using a model preliminarily trained by machine learning, and is not particularly limited.

<Operation of Information Processing Apparatus for Streamer>

Figure 15:
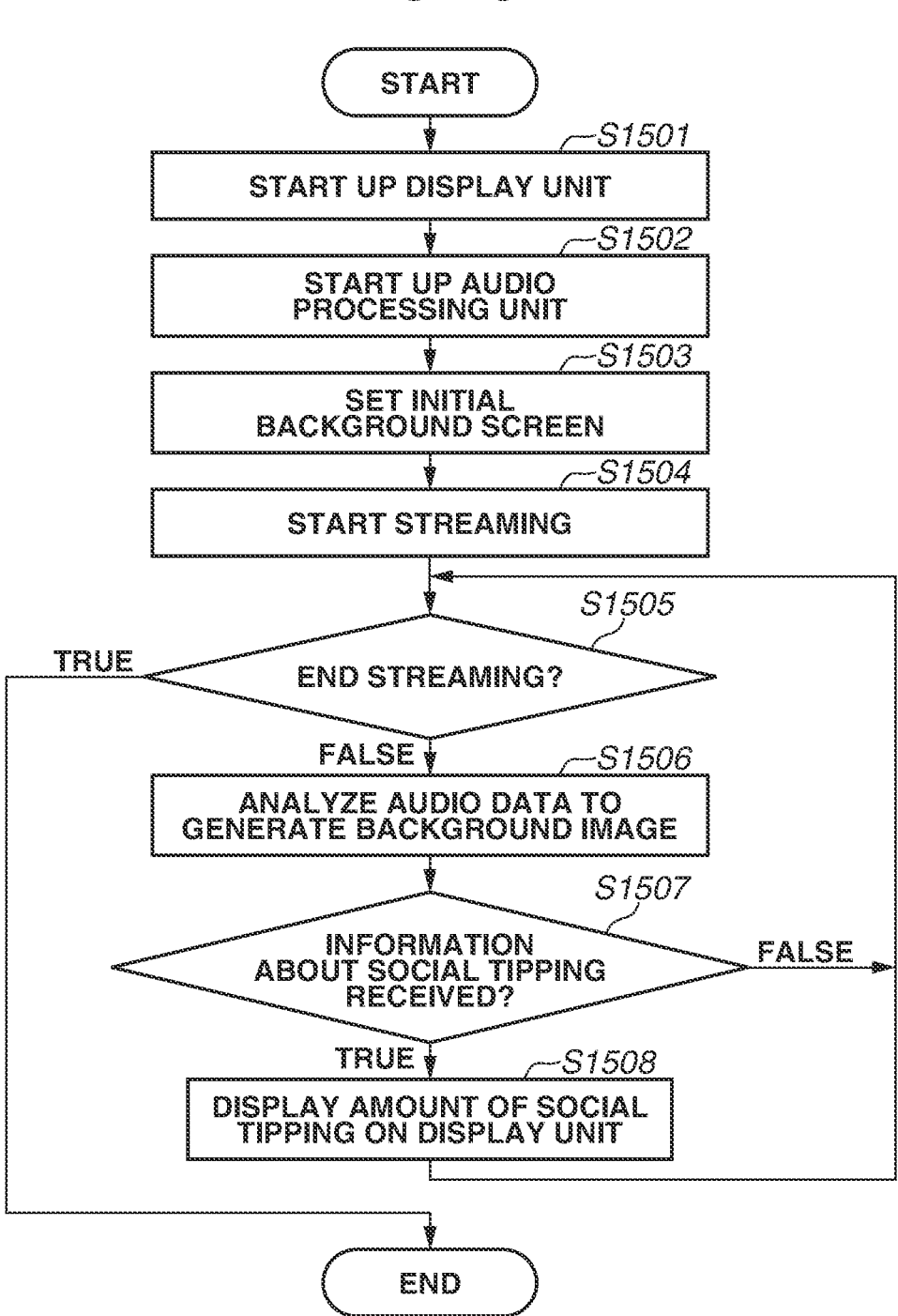
FIG. 15 is a flowchart illustrating an operation of an information processing apparatus for streamer in a third exemplary embodiment.

FIG. 15 is a flowchart illustrating an operation of the information processing apparatus for streamer 200 in the third exemplary embodiment.

Furthermore, in the flowchart of FIG. 15, processing operations similar to those in the flowchart of FIG. 5 are omitted from description as appropriate.

Processing operations in steps S1501 and step S1502 are similar to the processing operations in steps S502 and S503.

In step S1503, the CPU 201 sets an initial background screen, which is used at the time of streaming audio-only content, in response to an operation performed by the streamer via the operation unit 209. Furthermore, while it is favorable that the background image is a background image which enables the viewer to readily recognize that the current channel is a channel for streaming audio-only content, for example, a screen composition or layout is not particularly restricted.

Processing operations in steps S1504 and step S1505 are similar to the processing operations in steps S506 and S507.

In step S1506, the CPU 201 causes the audio processing unit 208 to analyze audio data which is currently streamed, causes the image processing unit 204 to generate background image data most suitable for the analyzed audio data, and transmits the generated background image data to the server apparatus 300.

Processing operations in steps S1507 and step S1508 are similar to the processing operations in steps S508 and S509.

<Display Examples in Information Processing Apparatus for Viewer>

Figure 16A:
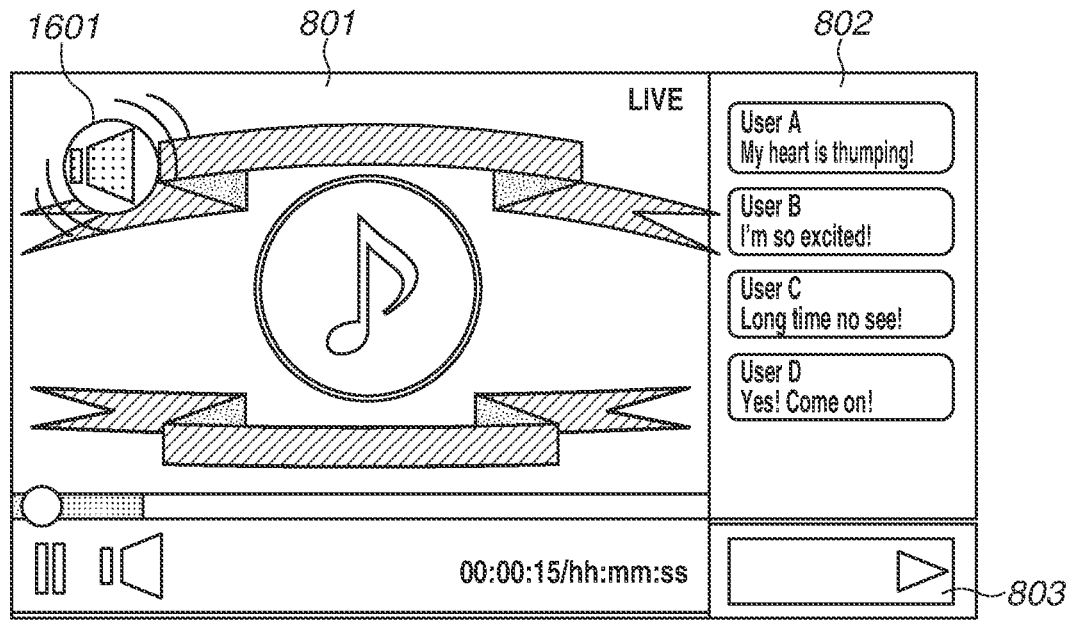
FIGS. 16A and 16B are diagrams illustrating display examples which are displayed when audio-only content has been streamed.
Figure 16B:
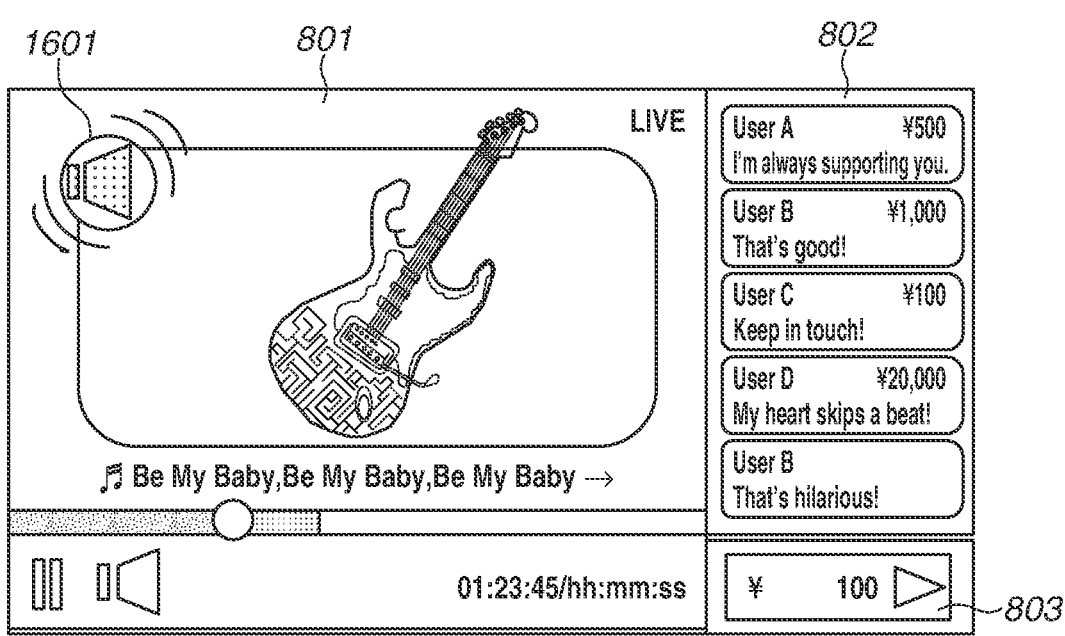

FIGS. 16A and 16B are diagrams each illustrating a display example which is displayed when audio-only content has been streamed. Furthermore, screen constituent components similar to those illustrated in FIGS. 8A to 8C are omitted from description as appropriate.

With regard to a screen for content which is displayed on the display unit 406, a microphone icon 1601 is displayed in the content display field 801. In a case where information about social tipping performed by a viewer has been received, the streamer (i.e., a performer) is able to perform voice output of thanks and comments with, for example, a microphone (not illustrated). At this time, the CPU 401 of the information processing apparatus for viewer 400 is able to notify the viewer that the streamer is performing voice output, by vibrating the microphone 1601 or displaying an animation for changing the shape or size thereof in conjunction with a voice.

FIG. 16A is a diagram illustrating a display example of an initial background screen, which is displayed immediately after the start of streaming of audio-only content. Here, in the content display field 801, a simple design which enables the viewer to recognize that audio-only content is being streamed is displayed. Displaying of the initial background screen illustrated in FIG. 16A is performed by the above-mentioned processing in step S1503 in the flowchart of FIG. 15.

FIG. 16B is a diagram illustrating a display example of a screen which is displayed after a predetermined time has elapsed from the start of streaming of audio-only content. Here, in the content display field 801, a graphics image of an electric guitar is displayed. Displaying of the screen illustrated in FIG. 16B is performed by the above-mentioned processing in step S1506 in the flowchart of FIG. 15. For example, in a case where the streamer is streaming a musical performance using an electric guitar, the audio processing unit 208 analyzes audio data which is being streamed and the image processing unit 204 generates a graphics image of an electric guitar suitable for the audio data, which is displayed as the screen illustrated in FIG. 16B.

In the above-described exemplary embodiments, for example, the case of displaying the amounts of social tipping performed by the other users in respective different forms has been described. In a fourth exemplary embodiment, a case where, if social tipping has been performed a predetermined number of times or more (consecutive posting of social tipping) by the same user within a previously determined unit time, the server apparatus 300 integrates pieces of information about the consecutive posting of social tipping into one piece of information about social tipping is described.

Figure 17:
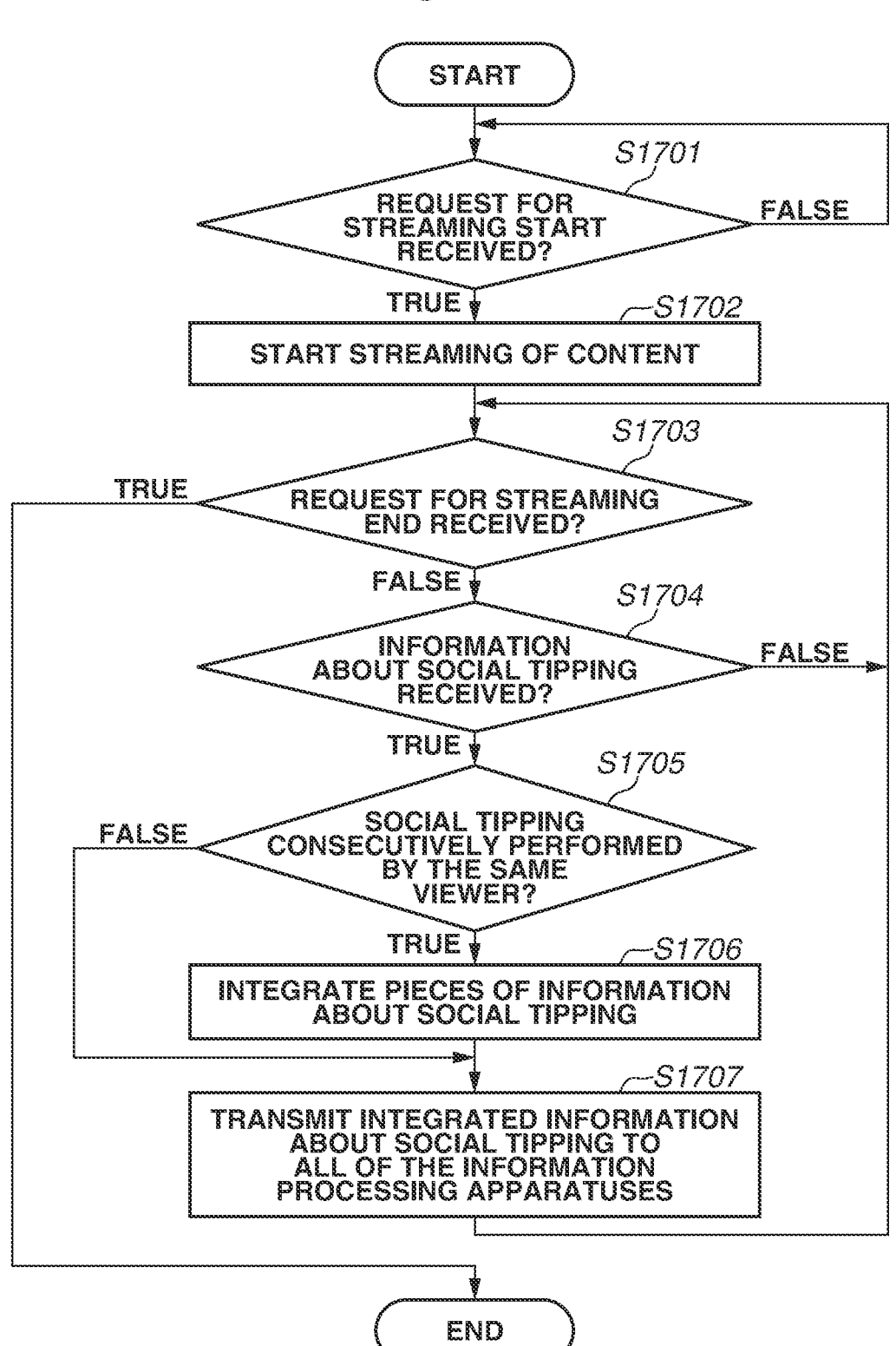
FIG. 17 is a flowchart illustrating an operation of a server apparatus in a fourth exemplary embodiment.

FIG. 17 is a flowchart illustrating an operation of the server apparatus 300 in the fourth exemplary embodiment. Furthermore, in the flowchart of FIG. 17, processing operations similar to those in the flowchart of FIG. 6 are omitted from description as appropriate.

Processing operations in steps S1701 to S1704 are similar to the processing operations in steps S601 to S604.

In step S1705, the CPU 301 analyzes the received information about social tipping and determines whether there has been a plurality of times of social tipping, i.e., consecutive posting of social tipping, performed by the same viewer within a predetermined period. Specifically, the CPU 301 determines whether information about social tipping having the same user account has been received a plurality of times (a predetermined number of times) within a predetermined period measured by a clocking unit. Furthermore, while a quantitative parameter for determining consecutive posting of social tipping is not defined, for example, in a case where there has been social tipping performed by the same viewer more than three times within ten minutes, it is highly likely that the same viewer is performing consecutive posting of social tipping clearly with purpose, so that it is favorable to set a parameter which involves such a case. If it is determined that there has been consecutive posting of social tipping performed by the same viewer (TRUE in step S1705), the CPU 301 advances the processing to step S1706, and, if it is determined that there has not been consecutive posting of social tipping (FALSE in step S1705), the CPU 301 advances the processing to step S1707.

In step S1706, the CPU 301 integrates (merges) pieces of information about social tipping consecutively performed by the same viewer. For example, the CPU 301 adds up the amounts of social tipping consecutively performed and extracts only information about the first comment from among comments included in pieces of information about social tipping consecutively performed.

In step S1707, the CPU 301 transmits, by broadcast, information obtained by integrating pieces of information about social tipping consecutively performed by the same viewer to all of the information processing apparatuses for viewer 400. For example, the CPU 301 transmits information about the amount obtained by integrating the amounts of social tipping consecutively performed by the same viewer and information about the first comment. Moreover, the CPU 301 transmits information indicating that pieces of information about social tipping consecutively performed by the same viewer have been integrated to all of the information processing apparatuses for viewer 400.

<Display Examples in Information Processing Apparatus for Viewer>

Figure 18A:
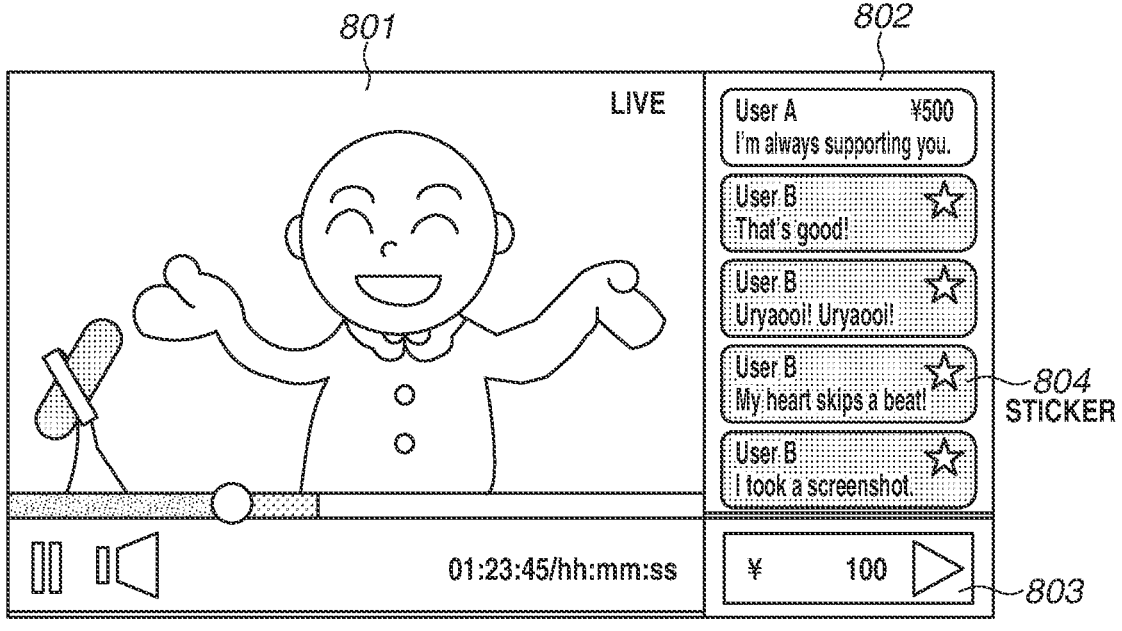
FIGS. 18A and 18B are diagrams illustrating display examples which are displayed when social tipping has been consecutively posted.
Figure 18B:
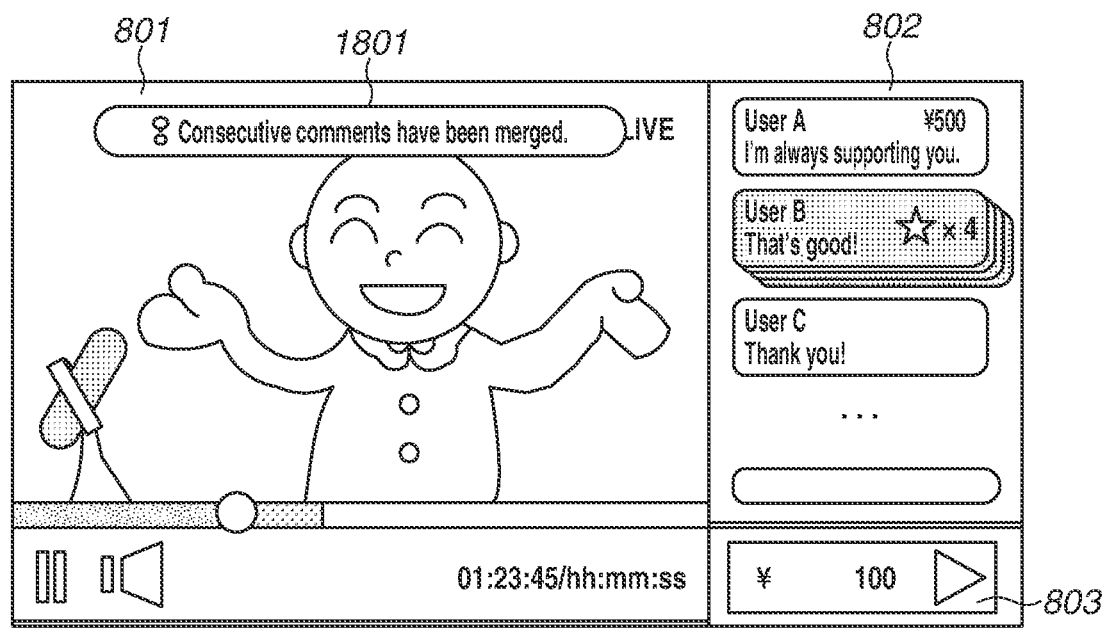

FIGS. 18A and 18B are diagrams each illustrating a display example which is displayed when consecutive posting of social tipping has been performed by the same viewer. Furthermore, screen constituent components similar to those illustrated in FIGS. 8A to 8C are omitted from description as appropriate.

FIG. 18A is a diagram illustrating a display example which is displayed when pieces of information about social tipping consecutively performed by the same viewer have been received without being integrated. Here, in response to social tipping consecutively performed by the User B, four stickers for the User B are displayed in the comment output field 802. Viewers other than the User B may feel it annoying that the comment output field 802 is occupied by comments made by a particular viewer.

FIG. 18B is a diagram illustrating a display example which is displayed when information obtained by integrating pieces of information about social tipping consecutively performed by the same viewer has been received. Here, in the comment output field 802, information obtained by putting together pieces of information about social tipping consecutively performed by the User B as a whole is displayed. Accordingly, comments in the comment output field 802 are visually organized, so that it is possible to visually recognize the contents of comments of viewers other than the User B. Moreover, in the content display field 801, in response to receiving information indicating that pieces of information about social tipping consecutively performed by the same viewer have been integrated, a message 1801 indicating that consecutive comments have been integrated (merged) is displayed. Such a message being displayed enables calling attention to all of the viewers including a viewer who has performed consecutive posting of social tipping.

In this way, according to the fourth exemplary embodiment, information obtained by integrating pieces of information about social tipping consecutively performed by the same viewer is transmitted by broadcast to all of the viewers. Accordingly, in the display unit 406 of the information processing apparatus for viewer 400, the comment output field 802 is prevented or reduced from being occupied by comments of a particular viewer for displaying, so that it is possible to ensure the fairness of content streaming.

Furthermore, while, in the fourth exemplary embodiment, a case where the server apparatus 300 integrates pieces of information about social tipping consecutively performed by the same viewer has been described, the fourth exemplary embodiment is not limited to this case. Thus, the CPU 401 of the information processing apparatus for viewer 400 performs processing operations in steps S1705 and S1706 to integrate pieces of information about social tipping consecutively performed into one piece of information to be displayed.

In the above-described exemplary embodiments, for example, a case where the amounts of social tipping performed by the other users are displayed in respective different forms has been described. In a fifth exemplary embodiment, a case where the streamer is able to set an upper limit value of the number of times of social tipping which the same viewer is allowed to perform during streaming of content and an upper limit value of the number of times of social tipping which the same viewer is allowed to perform per a previously set unit time and the server apparatus 300 cancels social tipping by which the number of times of social tipping has exceeded the upper limit value is described.

<Operation of Information Processing Apparatus for Streamer>

Figure 19:
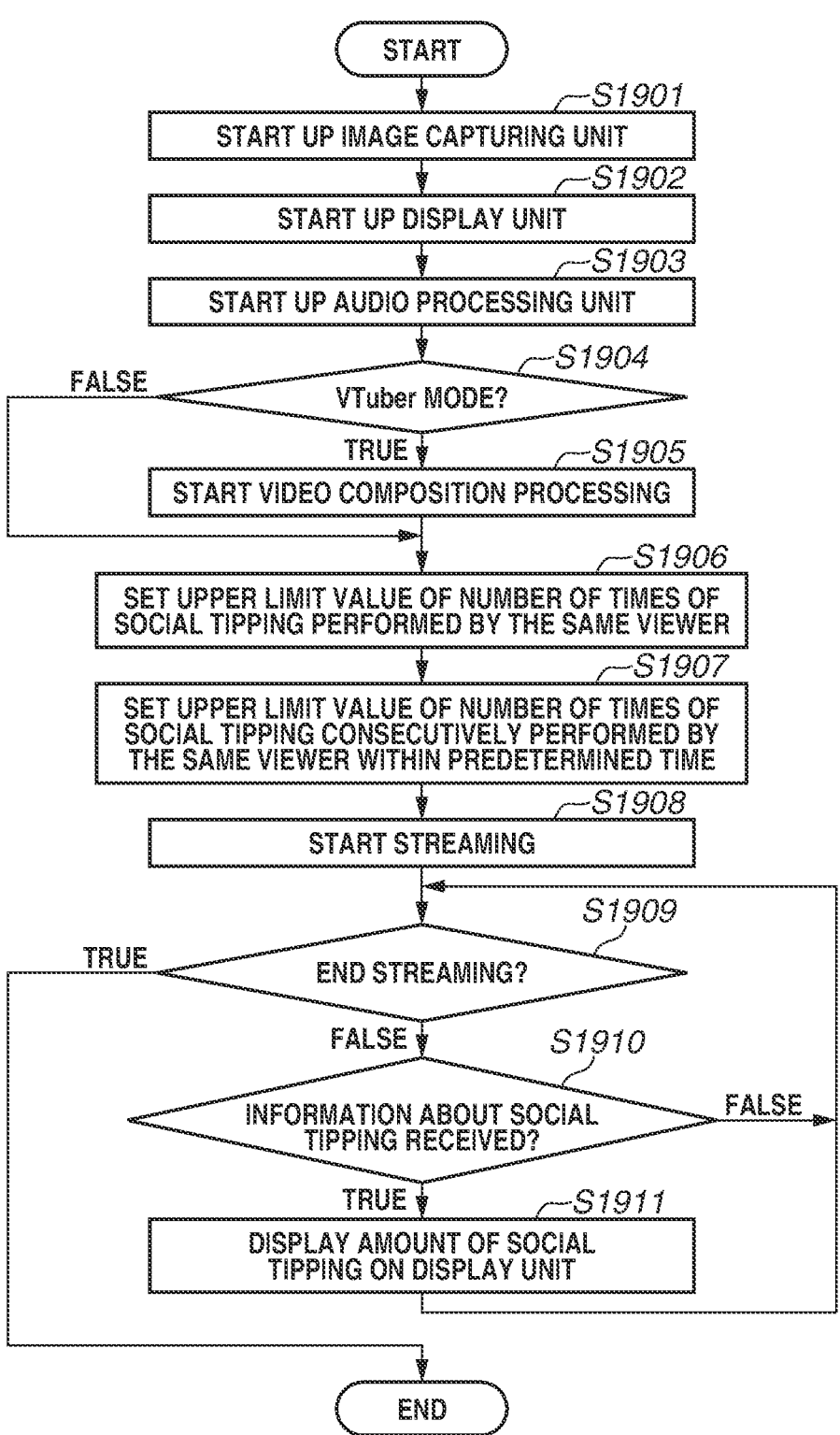
FIG. 19 is a flowchart illustrating an operation of an information processing apparatus for streamer in a fifth exemplary embodiment.

FIG. 19 is a flowchart illustrating an operation of the information processing apparatus for streamer 200 in the fifth exemplary embodiment. Furthermore, in the flowchart of FIG. 19, processing operations similar to those in the flowchart of FIG. 5 are omitted from description as appropriate.

Processing operations in steps S1901 to S1905 are similar to the processing operations in steps S501 to S505.

In step S1906, the CPU 201 sets, as control information, an upper limit value of the number of times (a first predetermined number of times) of social tipping per one person relative to content concerned, i.e., per the same viewer, according to an operation input by the streamer. Furthermore, while a specific upper limit value of the number of times of social tipping is not defined, for example, it is favorable to set the upper limit value of the number of times of social tipping within a common-sense range which the streamer desires, in such a way as to allow social tipping to be performed up to three times within a streaming time of content per the same viewer.

In step S1907, the CPU 201 sets, as control information, an upper limit value of the number of times (a second predetermined number of times) of social tipping within a predetermined time shorter than the streaming time of content per one person relative to the content concerned, i.e., per the same viewer, according to an operation input by the streamer. Furthermore, while a specific upper limit value of the number of times of social tipping is not defined, for example, it is favorable to set the upper limit value of the number of times of social tipping within a common-sense range which the streamer desires, in such a way as to allow social tipping to be performed up to two times within ten seconds per the same viewer.

Processing operations in steps S1908 to S1911 are similar to the processing operations in steps S506 to S509.

Furthermore, in step S1908, when transmitting a request for streaming start to the server apparatus 300, the CPU 201 transmits the respective pieces of control information set in step S1906 and S1907 to the server apparatus 300.

<Operation of Server Apparatus>

Figure 20:
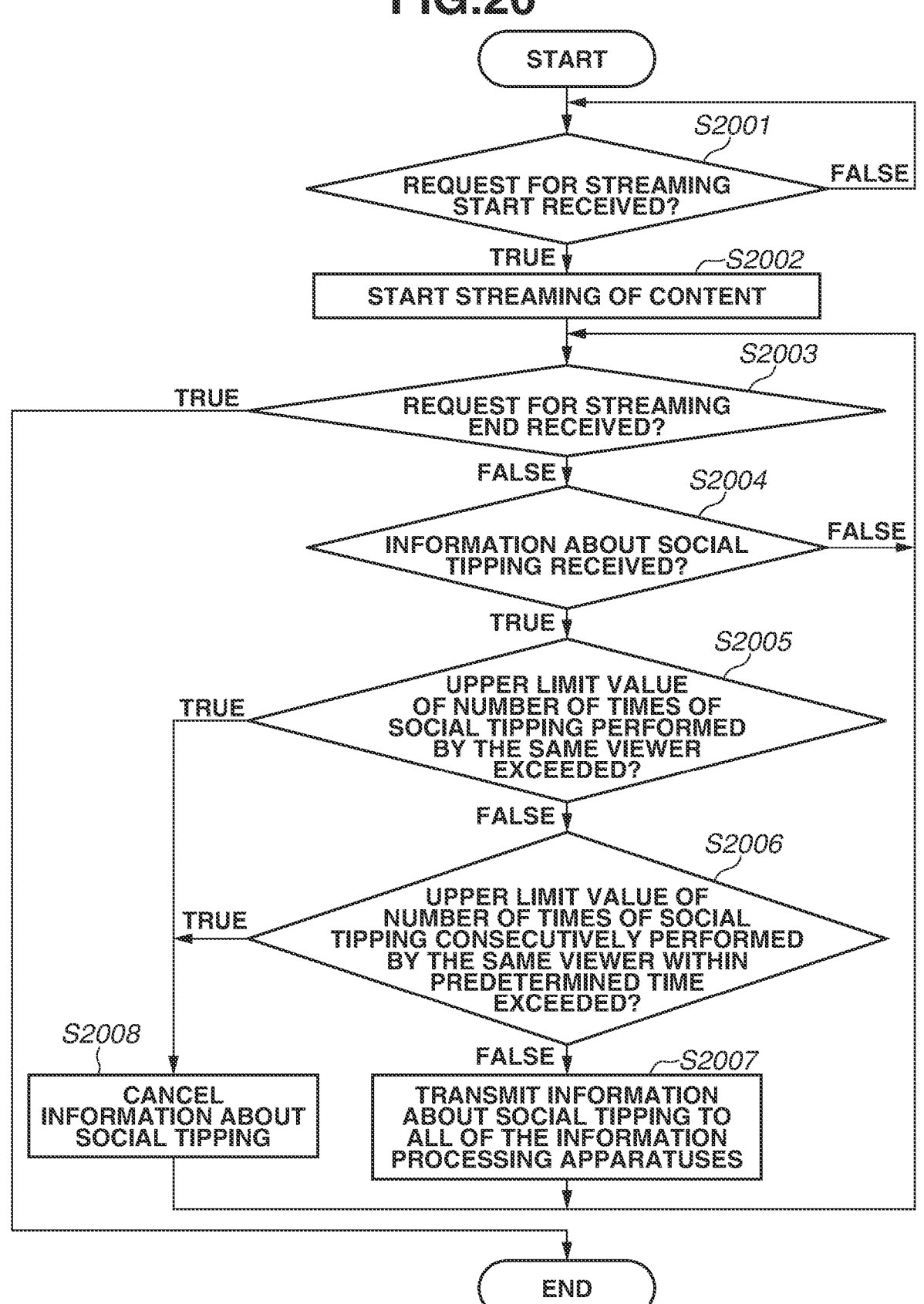
FIG. 20 is a flowchart illustrating an operation of a server apparatus in the fifth exemplary embodiment.

FIG. 20 is a flowchart illustrating an operation of the server apparatus 300 in the fifth exemplary embodiment. Furthermore, in the flowchart of FIG. 20, processing operations similar to those in the flowchart of FIG. 6 are omitted from description as appropriate.

Processing operations in steps S2001 to S2004 are similar to the processing operations in steps S601 to S604.

In step S2005, the CPU 301 refers to the received control information to analyze information about social tipping and thus determines whether the number of times of social tipping performed by the same viewer has exceeded the upper limit value. If it is determined that the number of times of social tipping has exceeded the upper limit value (TRUE in step S2005), the CPU 301 advances the processing to step S2008, and, if it is determined that the number of times of social tipping has not exceeded the upper limit value (FALSE in step S2005), the CPU 301 advances the processing to step S2006.

In step S2006, the CPU 301 refers to the received control information to analyze information about social tipping and thus determines whether the number of times of social tipping performed by the same viewer within a predetermined time has exceeded the upper limit value. If it is determined that, in a case where the same viewer is consecutively performing social tipping, the number of times of social tipping performed by the same viewer within the predetermined time has exceeded the upper limit value (TRUE in step S2006), the CPU 301 advances the processing to step S2008, and, if it is determined that the number of times of social tipping has not exceeded the upper limit value (FALSE in step S2006), the CPU 301 advances the processing to step S2007.

A processing operation in step S2007 is similar to the processing operation in step S605.

In step S2008, the CPU 301 cancels information about social tipping by which the number of times of social tipping performed by the same viewer has exceeded the upper limit value. Specifically, the CPU 301 does not remit the amount of social tipping by which the number of times of social tipping has exceeded the upper limit value to the streamer. Thus, the CPU 301 causes the amount of social tipping by which the number of times of social tipping has exceeded the upper limit value not to be associated with user account information about the streamer. Moreover, the CPU 301 notifies an information processing apparatus for viewer 400 which has performed social tipping by which the number of times of social tipping has exceeded the upper limit value that the social tipping concerned has been cancelled. The notification indicating that the social tipping concerned has been cancelled can include information about the amount of the cancelled social tipping. In this way, cancelling social tipping by which the number of times of social tipping has exceeded the upper limit value enables preventing undesired social tipping which the streamer determined in advance.

<Operation of Information Processing Apparatus for Viewer>

Figure 21:
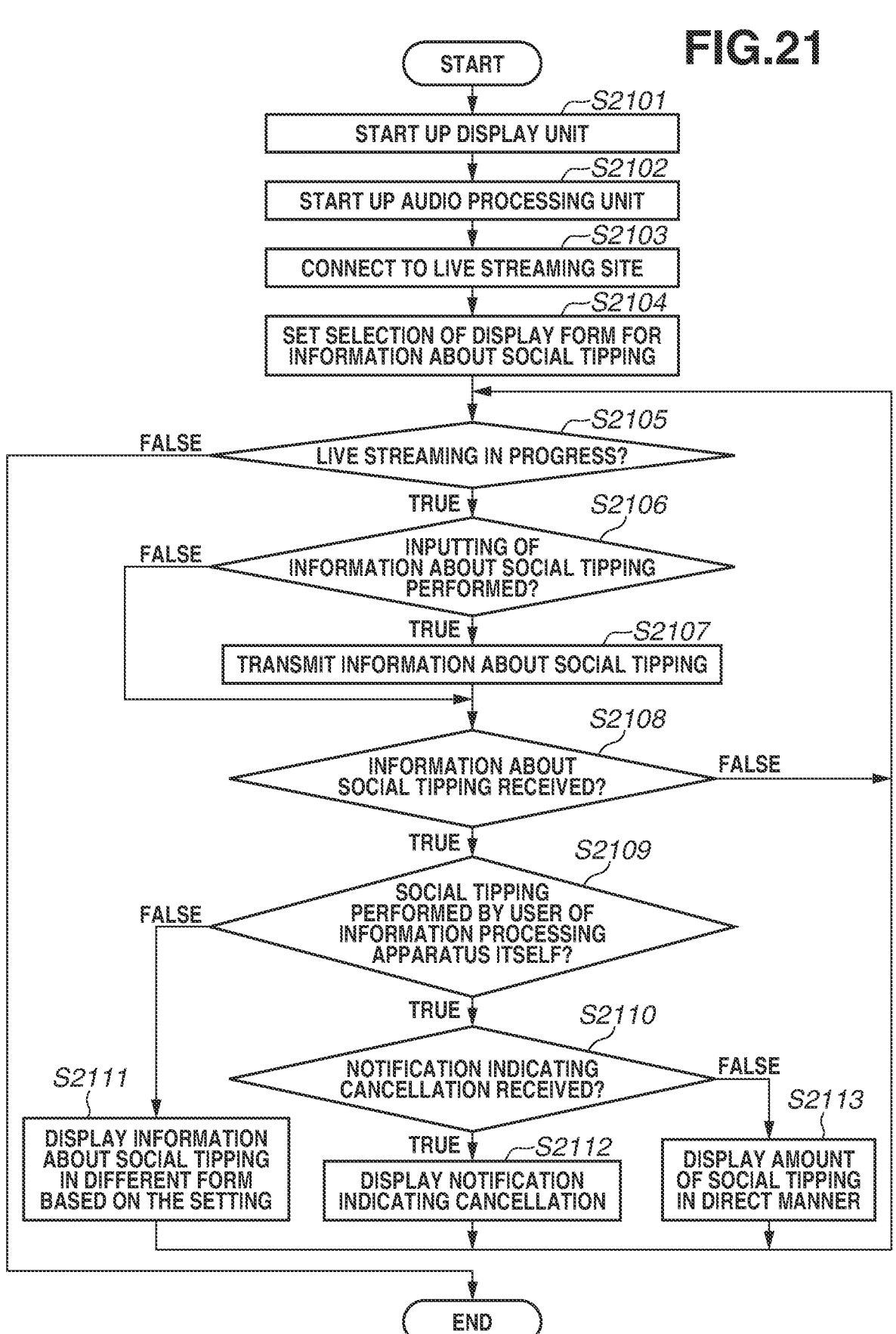
FIG. 21 is a flowchart illustrating an operation of an information processing apparatus for viewer in the fifth exemplary embodiment.

FIG. 21 is a flowchart illustrating an operation of the information processing apparatus for viewer 400 in the fifth exemplary embodiment. Furthermore, in the flowchart of FIG. 21, processing operations similar to those in the flowchart of FIG. 7 are omitted from description as appropriate.

Processing operations in steps S2101 to S2109 are similar to the processing operations in steps S701 to S709.

In step S2110, the CPU 401 determines whether a notification indicating that the social tipping has been cancelled has been received from the server apparatus 300. If it is determined that the notification has not been received (FALSE in step S2110), since information about social tipping which the information processing apparatus for viewer 400 itself has performed has been normally received, the CPU 401 advances the processing to step S2113. On the other hand, if it is determined that the notification has been received (TRUE in step S2110), since the information processing apparatus for viewer 400 has performed social tipping which the streamer does not want, the CPU 401 advances the processing to step S2112.

In step S2112, the CPU 401 displays, on the display unit 406, information indicating that the social tipping has been cancelled. Furthermore, in a case where the number of times of social tipping performed within a streaming time of content has exceeded the upper limit value, for example, the CPU 401 controls the operation unit 408 in such a way as to make inputting of social tipping unable to be performed or changes the color of a social tipping input field which is displayed on the display unit 406.

Processing operations in steps S2111 and S2113 are similar to the processing operations in steps S711 and S710.

<Display Examples in Information Processing Apparatus for Viewer>

Figure 22A:
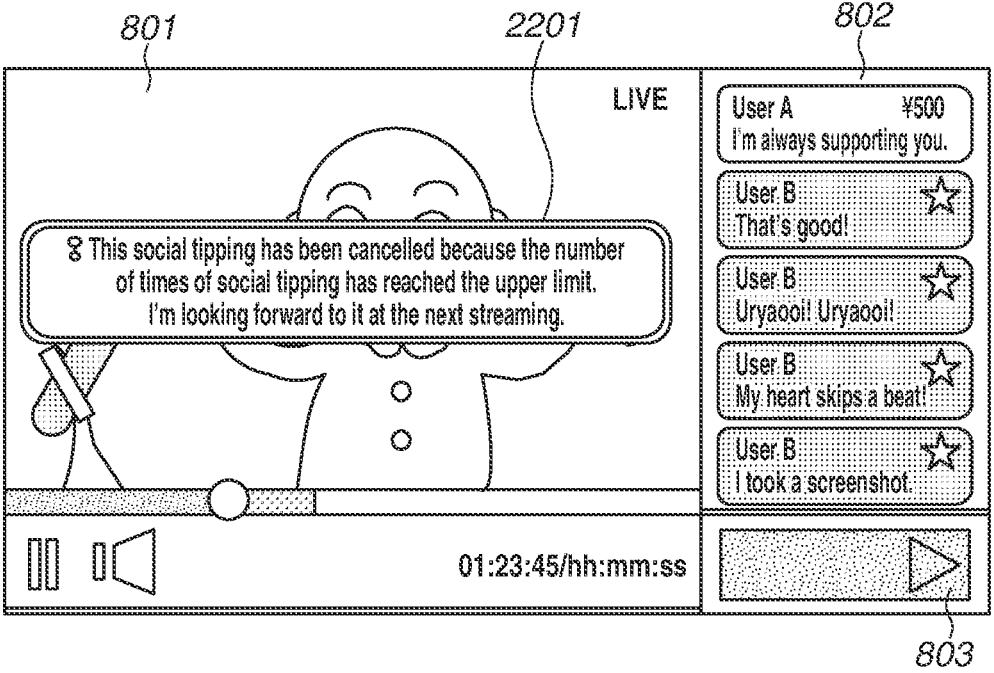
FIGS. 22A and 22B are diagrams illustrating display examples which are displayed when a cancel notification has been received.
Figure 22B:
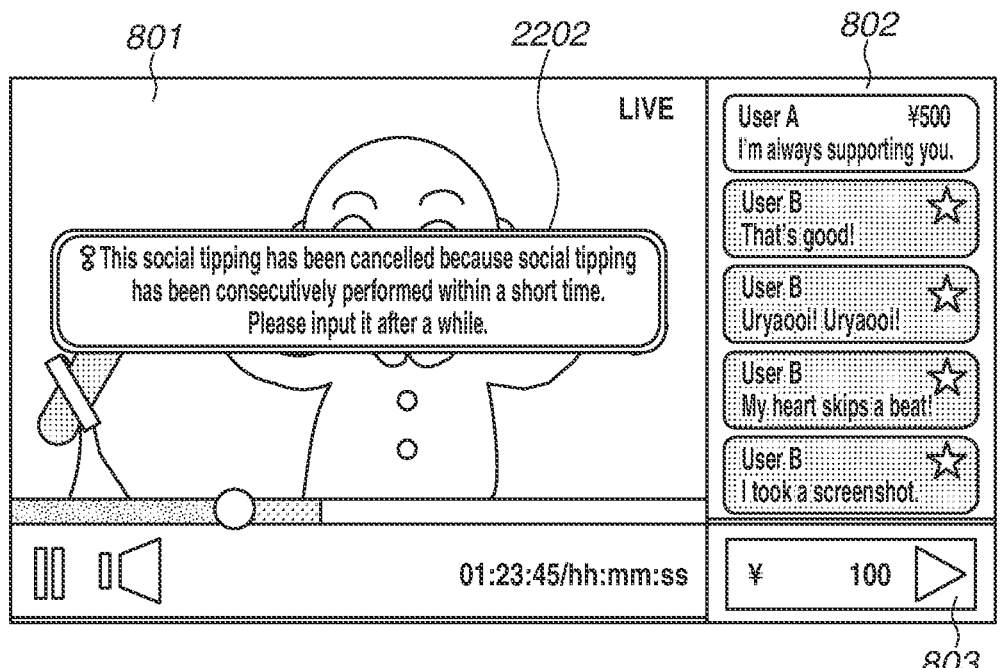

FIGS. 22A and 22B are diagrams each illustrating a display example which is displayed when a cancel notification has been received with respect to social tipping performed by the viewer. Furthermore, screen constituent components similar to those illustrated in FIGS. 8A to 8C are omitted from description as appropriate.

FIG. 22A is a diagram illustrating a display example of a screen which is displayed when the number of times of social tipping has exceeded the upper limit value within a streaming time of content. Here, in the content display field 801, a message 2201 indicating that the present social tipping has been cancelled because the number of times of social tipping has reached the upper limit is displayed in a superimposed manner with graphics data. Moreover, to cause the viewer to recognize that social tipping is currently not accepted, the social tipping input field 803 is displayed in a gray-out manner.

FIG. 22B is a diagram illustrating a display example of a screen which is displayed when the number of times of social tipping has exceeded the upper limit value within a predetermined time. Here, in the content display field 801, a message 2202 indicating that the present social tipping has been cancelled because social tipping has been consecutively performed within a short time is displayed in a superimposed manner with graphics data. Furthermore, in the case of the display example illustrated in FIG. 22B, since, as time passes, it becomes possible to perform social tipping again, the social tipping input field 803 is displayed in an active state.

Normally, it is desirable that social tipping be performed by the viewer according to the introduction, development, twist, and conclusion or story of content or the sharpness of an exciting scene. As in the fifth exemplary embodiment, the streamer, who knows the streaming particulars of content, is enabled to set the number of times of social tipping in advance, so that it is possible to prevent any trouble between the streamer and the viewer.

In the above-described exemplary embodiments, for example, the case of displaying the amounts of social tipping performed by the other users in respective different forms has been described. In a sixth exemplary embodiment, a case where the streamer is enabled to perform setting in such a way as to cause social tipping performed by the viewer in an instant before the time of end of content streaming not to be accepted, so that social tipping performed after the setting time is cancelled, is described.

<Operation of Information Processing Apparatus for Streamer>

Figure 23:
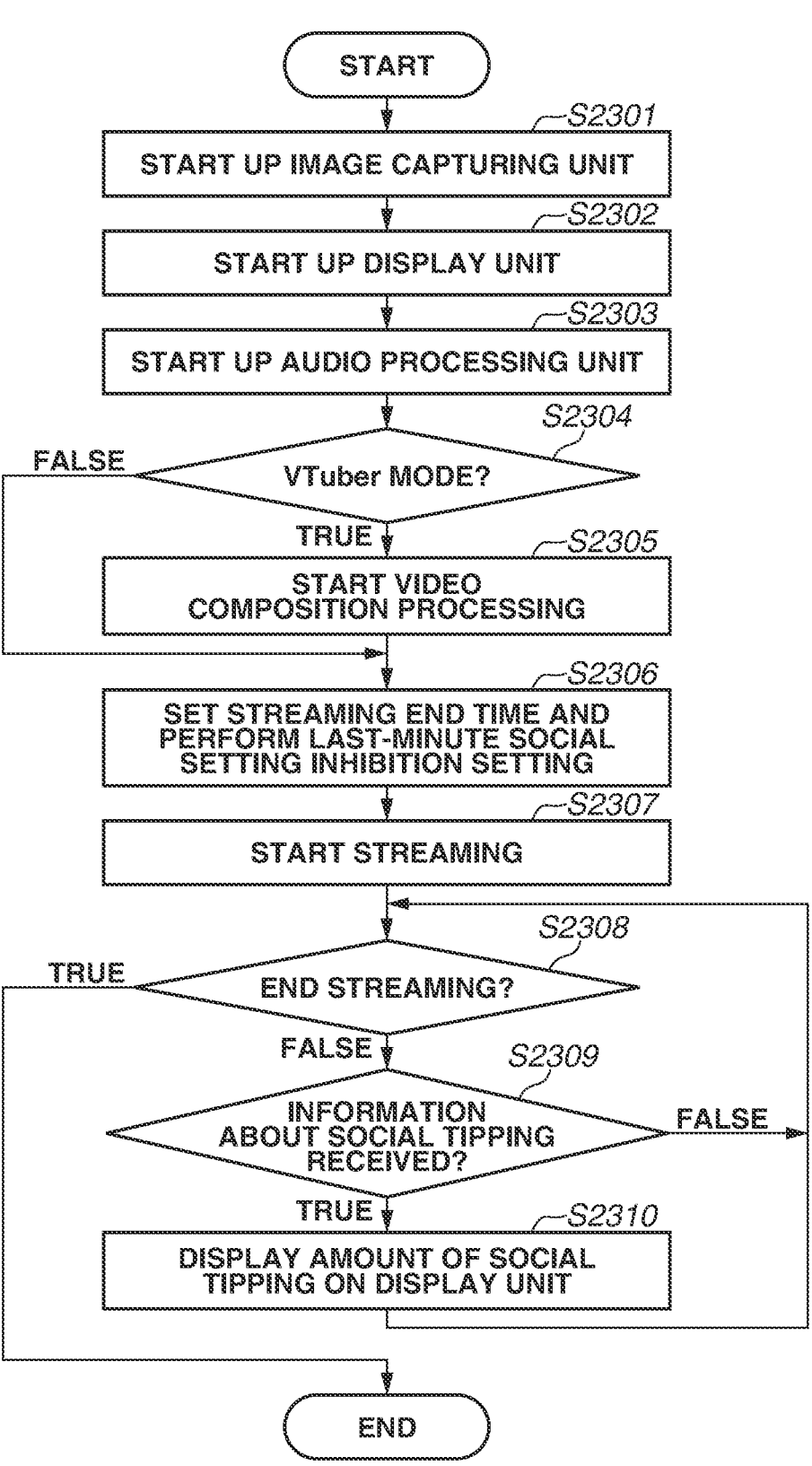
FIG. 23 is a flowchart illustrating an operation of an information processing apparatus for streamer in a sixth exemplary embodiment.

FIG. 23 is a flowchart illustrating an operation of the information processing apparatus for streamer 200 in the sixth exemplary embodiment. Furthermore, in the flowchart of FIG. 23, processing operations similar to those in the flowchart of FIG. 5 are omitted from description as appropriate.

Processing operations in steps S2301 to S2305 are similar to the processing operations in steps S501 to S505.

In step S2306, the CPU 201 sets streaming end time of content according to an operation input by the streamer.

Moreover, the CPU 201 performs inhibition setting which causes social tipping performed by the viewer in an instant before the streaming end time (last-minute social tipping) not to be accepted.

Processing operations in steps S2307 to S2310 are similar to the processing operations in steps S506 to S509.

Furthermore, in step S2307, when transmitting a request for streaming start to the server apparatus 300, the CPU 201 transmits, to the server apparatus 300, information about the streaming end time of content and information about the inhibition setting which causes social tipping (last-minute social tipping) not to be accepted, which have been set in step S2306.

<Operation of Server Apparatus>

Figure 24:
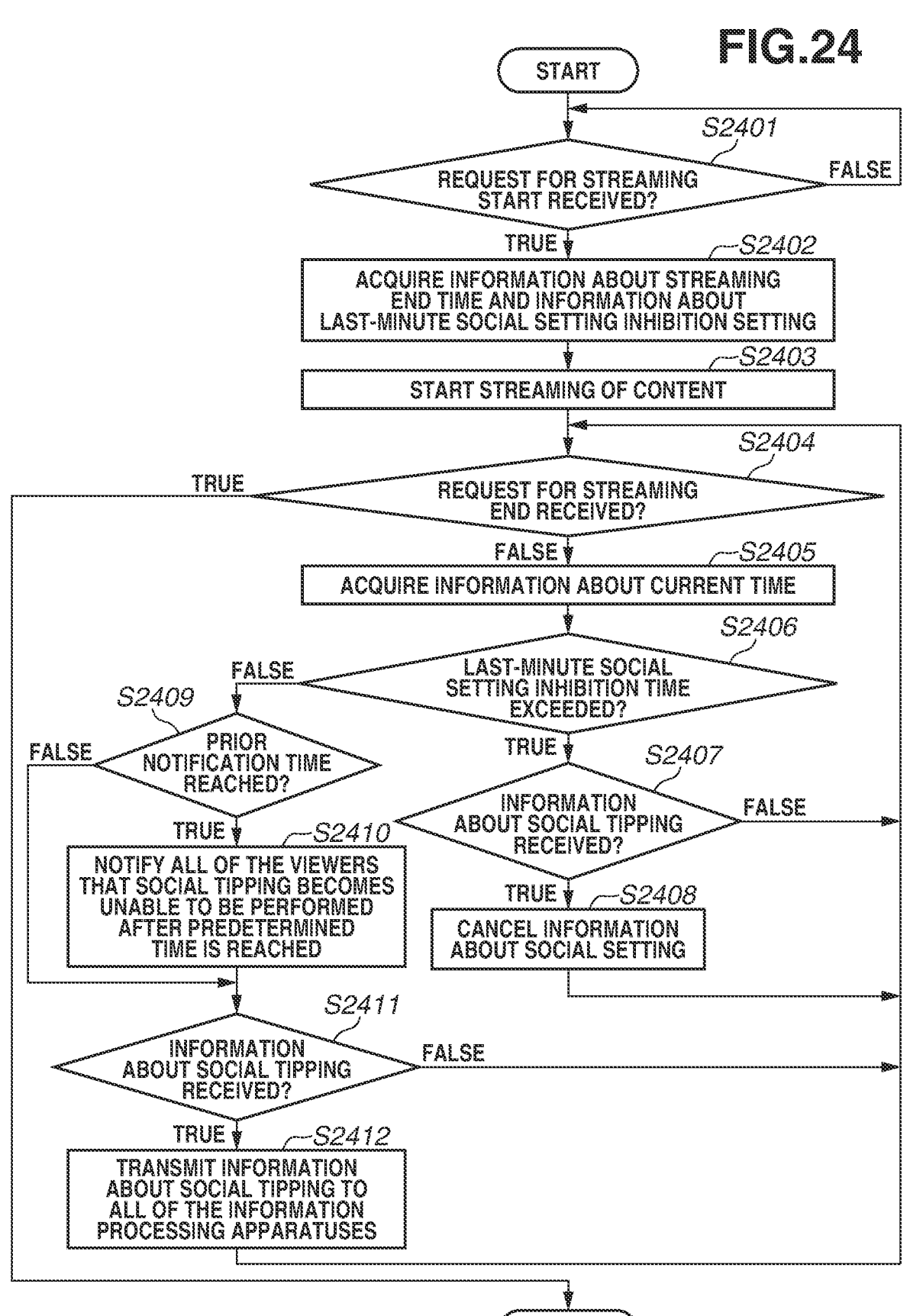
FIG. 24 is a flowchart illustrating an operation of a server apparatus in the sixth exemplary embodiment.

FIG. 24 is a flowchart illustrating an operation of the server apparatus 300 in the sixth exemplary embodiment. Furthermore, in the flowchart of FIG. 24, processing operations similar to those in the flowchart of FIG. 6 and the flowchart of FIG. 20 are omitted from description as appropriate.

A processing operation in step S2401 is similar to the processing operation in step S601.

In step S2402, the CPU 301 acquires information about streaming end time and information about inhibition setting which causes last-minute social tipping not to be accepted, which have been transmitted along with a request for streaming start.

Processing operations in steps S2403 and S2404 are similar to the processing operations in steps S602 and S603.

In step S2405, the CPU 301 acquires information about the current time from a clocking unit included in the server apparatus 300.

In step S2406, the CPU 301 sets time going back to a predetermined amount of time before the acquired streaming end time as inhibition time for last-minute social tipping. Here, while the predetermined time before the streaming end time is not defined, it is favorable that the predetermined time before the streaming end time is, for example, a time since which there is no exciting scene in content (for example, one minute, five minutes, or ten minutes). The CPU 301 compares the acquired current time and the set inhibition time for last-minute social tipping with each other and determines whether the current time has exceeded the inhibition time for last-minute social tipping. If it is determined that the current time has exceeded the inhibition time (TRUE in step S2406), the CPU 301 advances the processing to step S2407. Furthermore, a configuration in which the predetermined time before the streaming end time is set by the streamer in the above-mentioned step S2306 and the set predetermined time is transmitted from the information processing apparatus for streamer 200 to the server apparatus 300 can be employed. Moreover, a configuration in which the streamer is enabled to set inhibition time for last-minute social tipping from the beginning in the above-mentioned step S2306 and the set inhibition time for last-minute social tipping is transmitted from the information processing apparatus for streamer 200 to the server apparatus 300 can be employed.

A processing operation in step S2407 is similar to the processing operation in step S604.

In step S2408, the CPU 301 cancels information about social tipping received at timing which has exceeded the inhibition time for last-minute social tipping. Specifically, the CPU 301 does not remit, to the streamer, the amount of social tipping received after the inhibition time for last-minute social tipping. Thus, the CPU 301 causes the amount of social tipping concerned not to be associated with user account information about the streamer. Moreover, the CPU 301 notifies an information processing apparatus for viewer 400 which has performed social tipping at timing which has exceeded the inhibition time for last-minute social tipping that the social tipping concerned has been cancelled.

If, in step S2406, it is determined that the current time has not exceeded the inhibition time for last-minute social tipping (FALSE in step S2406), the CPU 301 advances the processing to step S2409.

In step S2409, the CPU 301 determines whether the current time has reached prior notification time. Here, the prior notification time is time for preliminarily notifying all of the viewers that, soon, social tipping becomes unable to be performed, in advance before the inhibition time for last-minute social tipping is reached. The CPU 301 sets, as the prior notification time, time going back to a specific amount of time, such as five minutes or ten minutes, before the inhibition time for last-minute social tipping. If it is determined that the current time has reached the prior notification time (TRUE in step S2409), the CPU 301 advances the processing to step S2410, and, it is determined that the current time has not yet reached the prior notification time (FALSE in step S2409), the CPU 301 advances the processing to step S2411.

In step S2410, the CPU 301 notifies all of the viewers who are viewing the content concerned, i.e., all of the information processing apparatuses for viewer 400, that social tipping becomes unable to be performed after predetermined time is reached.

Processing operations in steps S2411 and S2412 are similar to the processing operations in steps S604 and S605.

<Operation of Information Processing Apparatus for Viewer>

Figure 25:
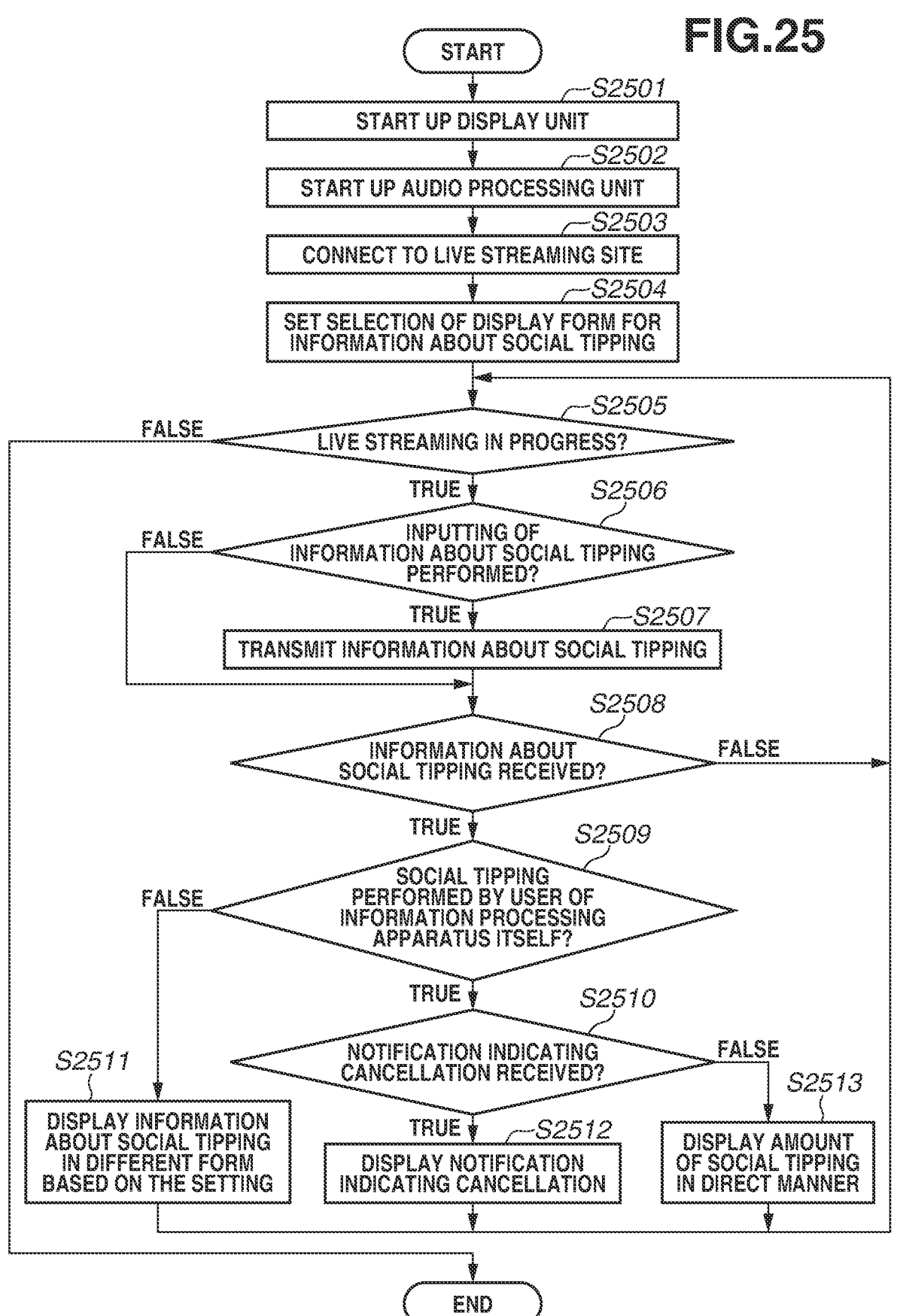
FIG. 25 is a flowchart illustrating an operation of an information processing apparatus for viewer in the sixth exemplary embodiment.

FIG. 25 is a flowchart illustrating an operation of the information processing apparatus for viewer 400 in the sixth exemplary embodiment. Furthermore, in the flowchart of FIG. 25, processing operations similar to those in the flowchart of FIG. 7 and the flowchart of FIG. 21 are omitted from description as appropriate.

Processing operations in steps S2501 to S2509 are similar to the processing operations in steps S701 to S709.

A processing operation in step S2510 is similar to the processing operation in step S2110.

A processing operation in step S2511 is similar to the processing operation in step S711.

A processing operation in step S2512 is similar to the processing operation in step S2112.

A processing operation in step S2513 is similar to the processing operation in step S710.

<Display Examples in Information Processing Apparatus for Viewer>

Figure 26A:
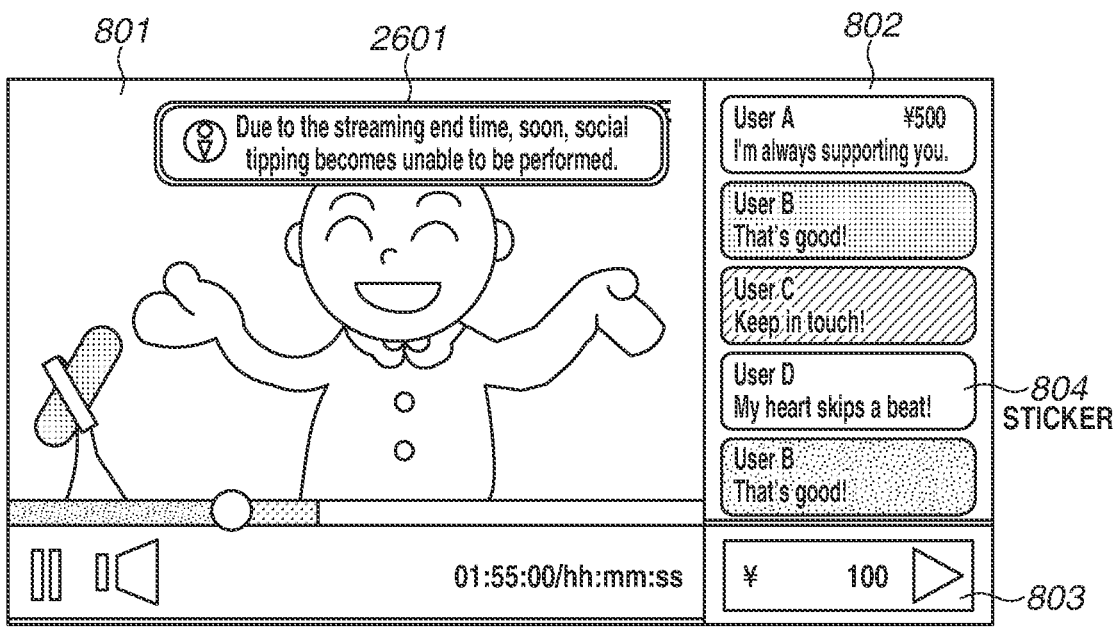
FIGS. 26A and 26B are diagrams illustrating display examples which are displayed when last-minute social tipping is cancelled.
Figure 26B:
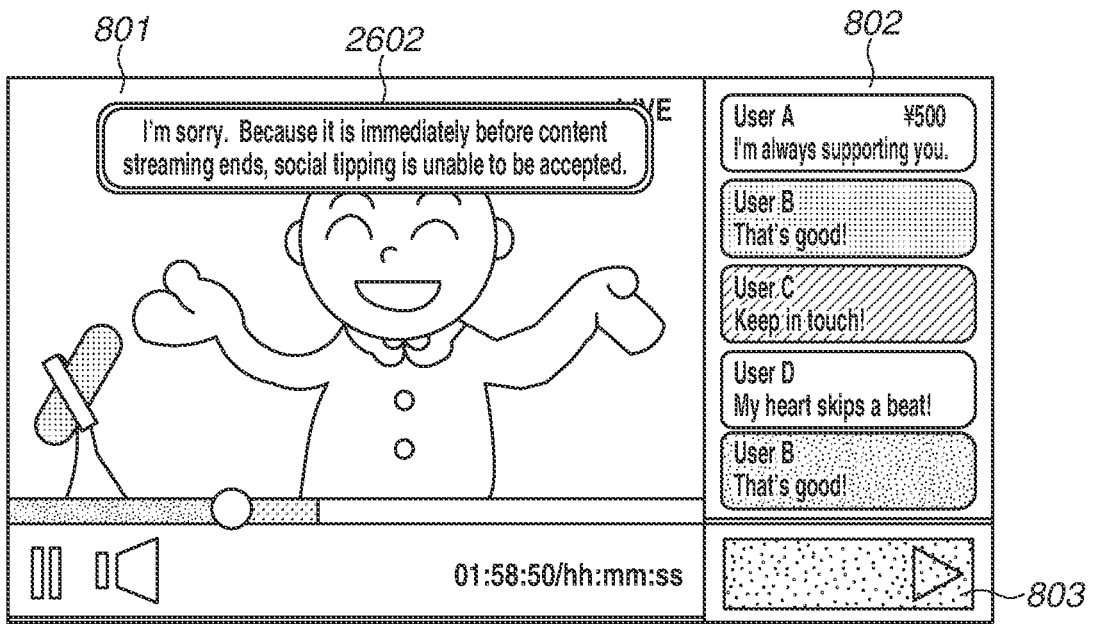

FIGS. 26A and 26B are diagrams each illustrating a display example which is displayed when last-minute social tipping is cancelled. Furthermore, screen constituent components similar to those in FIGS. 8A to 8C are omitted from description as appropriate.

FIG. 26A is a diagram illustrating a display example of a screen which is displayed when a notification indicating that social tipping becomes unable to be performed. Here, in the content display field 801, a message 2601 indicating that, due to the streaming end time, soon, social tipping becomes unable to be performed is displayed in a superimposed manner with graphics data.

FIG. 26B is a diagram illustrating a display example of a screen which is displayed when last-minute social tipping has been cancelled. Here, in the content display field 801, a message 2602 indicating that, because it is immediately before content streaming ends, social tipping is unable to be accepted is displayed in a superimposed manner with graphics data. Moreover, to cause the viewer to recognize that social tipping is currently not accepted, the social tipping input field 803 is displayed in a gray-out manner.

In this way, according to the sixth exemplary embodiment, it is possible to prevent last-minute social tipping. Accordingly, since it is possible to prevent or reduce excessive competition from the other user, it is possible to prevent a money-related trouble before it happens while maintaining a healthy interactivity between a streamer and a viewer concerning social tipping.

The present disclosure can also be implemented by processing for supplying a program for implementing one or more functions of the above-described exemplary embodiments to a system or apparatus via a network or a storage medium and causing one or more processors included in a computer of the system or apparatus to read out and execute the program. Moreover, the present disclosure can also be implemented by a circuit which implements one or more functions of the above-described exemplary embodiments (for example, an application specific integrated circuit (ASIC)).

Furthermore, the above-described various control operations, which have been described as being performed by the CPUs 201, 301, and 401, can also be performed by a single piece of hardware or can be shared for processing by a plurality of pieces of hardware (for example, a plurality of processors or circuits) to control the entire apparatus.

Moreover, while a case where information about social tipping includes user account information about a viewer who has performed social tipping, the amount of social tipping, and a comment of the viewer has been described, the above-described exemplary embodiments are not limited to this case, and information about social tipping can further include additional information. Moreover, the above-described exemplary embodiments are not limited to the case where information about social tipping includes user account information about a viewer who has performed social tipping, the amount of social tipping, and a comment of the viewer, and, as long as information about social tipping (user account information and the amount of social tipping) and a comment are associated with each other, the comment does not need to be included in the information about social tipping.

While the present disclosure has been described based on various exemplary embodiments thereof, the present disclosure is not limited to these specific exemplary embodiments, and various other embodiments within a range not departing from the gist of the present disclosure are also included in the present disclosure. Moreover, each exemplary embodiment should not be construed to limit the disclosure set forth in claims. While a plurality of features is described in each exemplary embodiment, not all of the plurality of features are always essential for the present disclosure, and some of the plurality of features can be optionally combined.

According to aspects of the present disclosure, it is possible to prevent excessive competition in social tipping between viewers while ensuring the benefit of a streamer in live streaming and maintaining an interaction between a streamer and a viewer who performs social tipping.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-163113 filed Oct. 11, 2022, which is hereby incorporated by reference herein in its entirety.

What is claimed is:

1. An information processing apparatus for displaying content received from a server apparatus on a display unit, the information processing apparatus comprising:

at least one memory storing a program; and at least one processor that executes the stored programs, which causes the at least one processor to:

transmit, to the server apparatus, a first amount of social tipping which is to be provided to a streamer of the content, in response to an operation performed on the information processing apparatus by a first user of the information processing apparatus, and to transmit, to the server apparatus, a second amount of social tipping which is to be provided to the streamer of the content, in response to an operation performed on the information processing apparatus by a second user of another information processing apparatus;

receive, from the server apparatus, respective pieces of the first amount of the social tipping and the second amount of the social tipping which the first user and the second user have provided to the streamer; and perform control in such a way as to display on the display unit, the first amount of the social tipping performed by the first user in a direct manner and hide the second amount of the social tipping performed by the second user.

2. The information processing apparatus according to claim 1, wherein the at least one processor performs control in such a way as to display, on the display unit, the second amount of the social tipping, in a different form depending on the second amount of the social tipping.

3. The information processing apparatus according to claim 2, wherein the at least one processor performs control in such a way as to display, on the display unit, a display item when the second amount of the social tipping has been received, and to, based on the second amount of the social tipping, change a color of the display item for each range differing in value and display the display item in the changed color.

4. The information processing apparatus according to claim 2, wherein the at least one processor performs control in such a way as to replace the information indicating the second amount of the social tipping with a display item and display the display item on the display unit, and to, based on the second amount of the social tipping, change at least one of a color of the display item, a size of the display item, a number of display items each corresponding to the display item, an image of the display item for each range differing in value and display the display item or items in the changed manner.

5. The information processing apparatus according to claim 1, wherein the at least one processor performs control in such a way as to cause a sound to be output when the second amount of the social tipping has been received, and to, based on the second amount of the social tipping, change at least one of a type of the sound and a volume of the sound for each range differing in value and output the sound in the changed manner.

6. The information processing apparatus according to claim 1, wherein the at least one processor further:

transmits, to the server apparatus, information about a comment made when the first user has provided a thing to the streamer, and receives, from the server apparatus, respective pieces of information about comments made when the first user and the second user have provided respective things to the streamer.

7. The information processing apparatus according to claim 6, wherein the at least one processor performs control in such a way as to display the comment made by the first user on the display unit and to hide the comment made by the second user.

8. The information processing apparatus according to claim 6, wherein the at least one processor performs control in such a way as to display the comment made by the first user on the display unit and to, among comments made by the second user and/or subsequent users, hide at least one of the comment made when the second amount of the social tipping is less than a predetermined value and the comment made when the second amount of the social tipping is greater than or equal to the predetermined value.

9. The information processing apparatus according to claim 6, wherein the at least one processor performs control in such a way as to display the comment made by the first user on the display unit and to display comments made by the second user and/or subsequent users up to a predetermined number of second users and hide comments made by the second user and/or the subsequent users exceeding the predetermined number of users.

10. The information processing apparatus according to claim 1, wherein the at least one processor performs control in such a way as to, based on information set by the first user via an operation unit, output the first amount of the social tipping and the second amount of the social tipping.

11. A control method for an information processing apparatus for displaying content received from a server apparatus on a display unit, the control method comprising:

transmitting, to the server apparatus, information indicating a first amount of the social tipping which is to be provided to a streamer of the content, in response to an operation performed on the information processing apparatus by a first user of the information processing apparatus, and transmitting, to the server apparatus, information indicating a second amount of the social tipping which is to be provided to the streamer of the content, in response to an operation performed on the information processing apparatus by a second user of another information processing apparatus;

receiving, from the server apparatus, respective pieces of information indicating the first amount of the social tipping and the second amount of the social tipping which the first user and the second user have provided to the streamer; and performing control in such a way as to display on the display unit, the first amount of the social tipping performed by the first user in a direct manner and hide the second amount of the social tipping performed by the second user.

12. A non-transitory computer-readable storage medium storing computer-executable instructions that, when executed by a computer, cause the computer to perform a control method for an information processing apparatus for displaying content received from a server apparatus on a display unit, the control method comprising:

transmitting, to the server apparatus, information indicating a first amount of the social tipping which is to be provided to a streamer of the content, in response to an operation performed on the information processing apparatus by a first user of the information processing apparatus, and transmitting, to the server apparatus, information indicating a second amount of the social tipping which is to be provided to the streamer of the content, in response to an operation performed on the information processing apparatus by a second user of another information processing apparatus;

receiving, from the server apparatus, respective pieces of information indicating the first amount of the social tipping and the second amount of the social tipping which the first user and the second user have provided to the streamer; and performing control in such a way as to display on the display unit, the first amount of the social tipping performed by the first user in a direct manner and hide the second amount of the social tipping performed by the second user.

13. An information processing system comprising:

an information processing apparatus for streamer;

a server apparatus; and a plurality of information processing apparatuses for viewer, wherein the information processing apparatus for the streamer includes a unit configured to transmit a content to the server apparatus, wherein the server apparatus is configured to:

transmit the content received from the information processing apparatus for streamer to the plurality of information processing apparatuses for viewer, receive pieces of information indicating at least one amount of social tipping to be provided from the plurality of information processing apparatuses for viewer to a streamer of the content, and transmit the received pieces of information indicating the at least one amount of the social tipping to the information processing apparatus for streamer and the plurality of information processing apparatuses for viewer, and wherein each of the plurality of information processing apparatuses for viewer is configured to:

display content received from the server apparatus on a display unit, transmit, to the server apparatus, information indicating a first amount of the social tipping which is to be provided to the streamer, in response to an operation performed on the information processing apparatus for viewer by a first user of the information processing apparatus for viewer, and transmit, to the server apparatus, information indicating a second amount of the social tipping which is to be provided to the streamer, in response to an operation performed on the information processing apparatus for viewer by a second user of another information processing apparatus;

receive, from the server apparatus, respective pieces of information indicating the amount of social tipping and the second amount of the social tipping which the first user and the second user have provided to the streamer; and perform control in such a way as to display on the display unit, the first amount of the social tipping performed by the first user in a direct manner and hide the second amount of the social tipping performed by the second user.

14. The information processing system according to claim 13, wherein the information processing apparatus for streamer is further configured to perform control in such a way as to directly display the first amount of the social tipping and the second amount of the social tipping received from the server apparatus on the information processing apparatus for streamer.

15. The information processing system according to claim 13, wherein the server apparatus is further configured to, in at least one of a case where information indicating the monetary value exceeding a first predetermined number of times has been received within a streaming time of the content from the same information processing apparatus for viewer and a case where information indicating the monetary value exceeding a second predetermined number of times has been received within a predetermined time shorter than the streaming time of the content from the same information processing apparatus for viewer, perform control in such a way as to cancel provision of the amount of social tipping to the streamer corresponding to the information indicating the monetary value exceeding the first predetermined number of times or the information indicating the monetary value exceeding the second predetermined number of times.

16. The information processing system according to claim 15, wherein the server apparatus is further configured to notify the information processing apparatus for viewer of information indicating that provision of the amount of the social tipping to the streamer has been cancelled.

17. The information processing system according to claim 13, wherein the server apparatus further includes a unit configured to, in a case where the amount of social tipping for a time exceeding a predetermined number of times has been received within a predetermined period from the same information processing apparatus for viewer, integrate pieces of the amount of the social tipping for times exceeding the predetermined number of times into one piece of information and transmit the one piece of information to the plurality of information processing apparatuses for viewer.

18. A control method for an information processing system including an information processing apparatus for streamer, a server apparatus, and an information processing apparatus for viewer, the control method comprising:

causing the information processing apparatus for streamer to transmit content to the server apparatus;

causing the server apparatus to:

transmit content received from the information processing apparatus for streamer to a plurality of information processing apparatuses for viewer each corresponding to the information processing apparatus for viewer;

receive pieces of amount of social tipping to be provided from the plurality of information processing apparatuses for viewer to a streamer of the content; and transmit the received pieces of the amount of social tipping to the information processing apparatus for streamer and the plurality of information processing apparatuses for viewer; and causing the information processing apparatus for viewer to:

display content received from the server apparatus on a display unit;

transmit, to the server apparatus, information indicating a first amount of social tipping which is to be provided to the streamer, in response to an operation performed on the information processing apparatus for viewer by a first user of the information processing apparatus for viewer, and transmit, to the server apparatus, information indicating a second amount of the social tipping which is to be provided to the streamer of the content, in response to an operation performed on the information processing apparatus for viewer by a second user of another information processing apparatus for viewer;

receive, from the server apparatus, respective pieces of the first amount of the social tipping and the second amount of the social tipping which the first user and the second user have provided to the streamer; and perform control in such a way as to display on the display unit, the first amount of the social tipping performed by the first user in a direct manner and hide the second amount of the social tipping performed by the second user.

\* \* \* \* \*